(12) United States Patent
Sugita

(10) Patent No.: US 9,354,360 B2
(45) Date of Patent: May 31, 2016

(54) ERECTING EQUAL-MAGNIFICATION LENS ARRAY UNIT, IMAGE READING DEVICE AND IMAGE FORMING DEVICE

(75) Inventor: Tomoya Sugita, Machida (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 14/241,030

(22) PCT Filed: Aug. 24, 2012

(86) PCT No.: PCT/JP2012/005333
§ 371 (c)(1),
(2), (4) Date: Feb. 25, 2014

(87) PCT Pub. No.: WO2013/031163
PCT Pub. Date: Mar. 7, 2013

(65) Prior Publication Data
US 2014/0226202 A1    Aug. 14, 2014

(30) Foreign Application Priority Data

Aug. 26, 2011  (JP) .................................. 2011-185328
Aug. 26, 2011  (JP) .................................. 2011-185338
Nov. 28, 2011  (JP) .................................. 2011-259596
Dec. 2, 2011   (JP) .................................. 2011-265286

(51) Int. Cl.
*G02B 23/24*    (2006.01)
*G02B 3/00*     (2006.01)
(Continued)

(52) U.S. Cl.
CPC .............. *G02B 3/0062* (2013.01); *G02B 3/005* (2013.01); *G02B 13/22* (2013.01); *G02B 13/26* (2013.01); *H04N 1/02855* (2013.01); *H04N 1/02895* (2013.01)

(58) Field of Classification Search
CPC .... G02B 27/2214; G02B 3/0037; G02B 3/00; G02B 13/0085; G02B 3/005; G02B 1/04; G02B 1/041; G02B 3/0056; G02B 3/0062; G02B 3/0006; G02B 3/0015; G02B 13/143; G02B 1/002; G02B 27/0018; G02B 27/22; G02B 27/2228; G02B 3/0031
USPC ......... 359/362, 642, 355, 440, 462, 503, 591, 359/611, 619
See application file for complete search history.

(56) References Cited

U.S. PATENT DOCUMENTS 6,693,748 B1 * 2/2004 Fujimoto et al. .............. 359/621
2001/0028506 A1 10/2001 Fujimoto et al.
(Continued)

FOREIGN PATENT DOCUMENTS

CN    1320374 C     6/2007
JP    S54-28130 A   3/1979
(Continued)

OTHER PUBLICATIONS

International Search Report; PCT/JP2012/005333; Nov. 13, 2012.
(Continued)

*Primary Examiner* — James Greece
*Assistant Examiner* — Sharrief Broome
(74) *Attorney, Agent, or Firm* — Procopio Cory Hargreaves and Savitch LLP

(57) ABSTRACT

An erecting equal-magnification lens array unit includes a first lens array and a second lens array. The first lens array includes a plurality of first lenses. The second lens array includes a plurality of second lenses. The optical axes of the second lenses overlap with the optical axes of the first lenses. Each first lens and second lens with overlapping optical axes form a unit optical system. Each unit optical system is an erecting equal-magnification optical system. Each unit optical system is substantially telecentric on at least the object side. The imaging position, by each first lens, of an object is positioned between the first lens array and the second lens array.

17 Claims, 19 Drawing Sheets

(51) Int. Cl.
  *G02B 13/22* (2006.01)
  *G02B 13/26* (2006.01)
  *H04N 1/028* (2006.01)

(56) References Cited

U.S. PATENT DOCUMENTS

| | | |
|---|---|---|
| 2009/0086328 A1 | 4/2009 | Sowa et al. |
| 2010/0177401 A1 | 7/2010 | Shiraishi |
| 2011/0249304 A1 | 10/2011 | Kaise |

FOREIGN PATENT DOCUMENTS

| | | | |
|---|---|---|---|
| JP | S64-17017 A | | 1/1989 |
| JP | 2000-019441 A | | 1/2000 |
| JP | 2000-295445 A | | 10/2000 |
| JP | 2001-352429 A | | 12/2001 |
| JP | 2003-139911 A | | 5/2003 |
| JP | 2006-030722 | * | 2/2006 |
| JP | 2006-30722 A | | 2/2006 |
| JP | 2007-094103 A | | 4/2007 |
| JP | 2009-098613 A | | 5/2009 |
| JP | 2010-164974 A | | 7/2010 |
| JP | 2011-223190 A | | 11/2011 |
| JP | 2012-078834 A | | 4/2012 |

OTHER PUBLICATIONS

"Notification of the First Office Action" issued by the State Intellectual Property Office of China on May 6, 2015, which corresponds to Chinese Patent Application No. 201280041430.7 and is related to U.S. Appl. No. 14/241,030; with English language translation.

Office Action dated 26 Jan. 2016 issued in counterpart Japanese Patent Application No. 2012-259548.

* cited by examiner

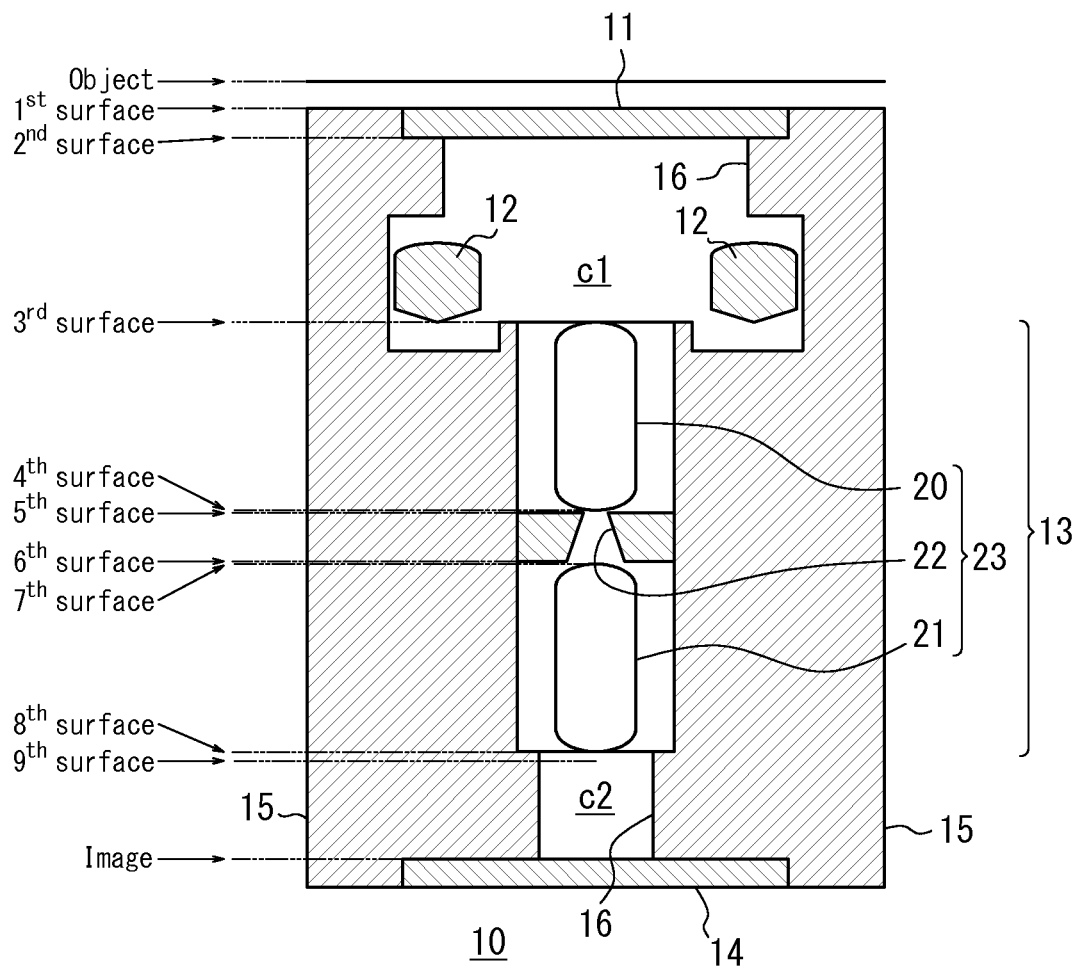
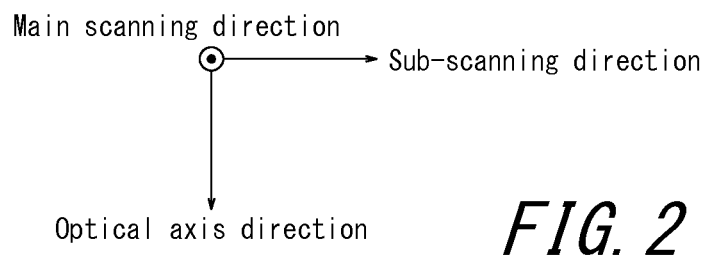
FIG. 2

FIG. 10
(a)
Object surface at ideal position
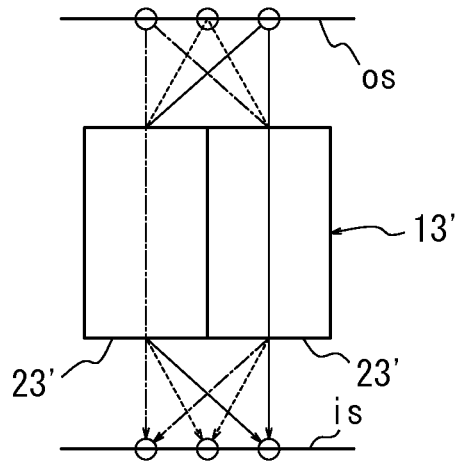
(b)
Object surface displaced from ideal position
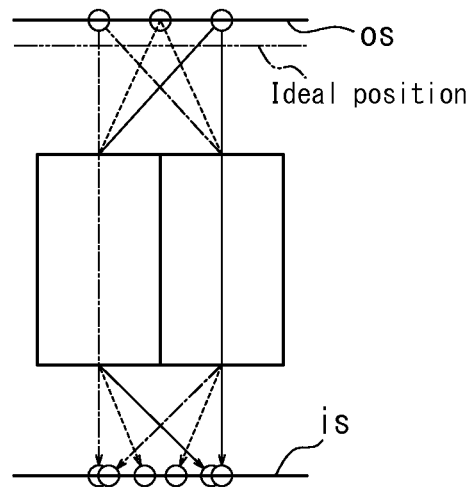

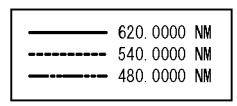
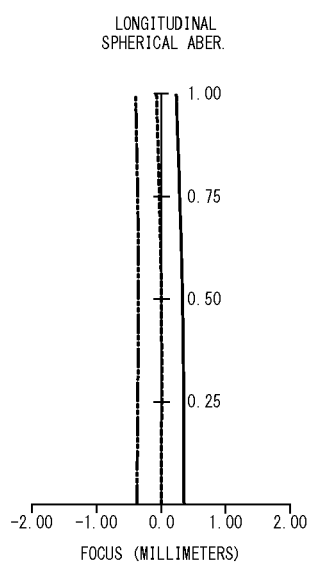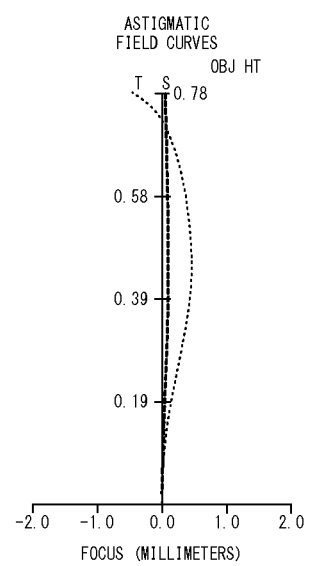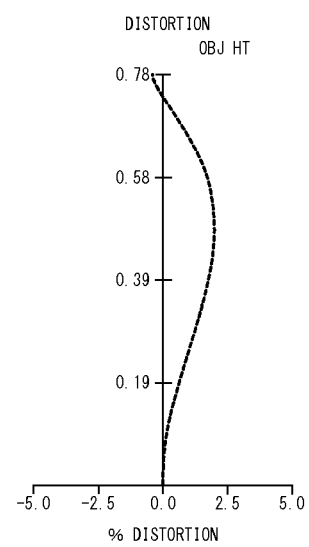
FIG. 14

ERECTING EQUAL-MAGNIFICATION LENS ARRAY UNIT, IMAGE READING DEVICE AND IMAGE FORMING DEVICE

CROSS-REFERENCE TO RELATED APPLICATION

This application claims priority to and the benefit of Japanese Patent Application Nos. 2011-185328 and 2011-185338 filed Aug. 26, 2011, Japanese Patent Application No. 2011-259596 filed Nov. 28, 2011, and Japanese Patent Application No. 2011-265286 filed Dec. 2, 2011, the entire contents of which are incorporated herein by reference.

TECHNICAL FIELD

The present invention relates to an erecting equal-magnification lens array unit used in an image reading device such as a scanner, facsimile, or the like, and to an image reading device and image forming device.

BACKGROUND

An optical reduction system or an erecting equal-magnification optical system is used in an image reading device, such as a scanner, facsimile, or the like, and in an image forming device, such as an LED printer or the like. In particular, as compared to when using an optical reduction system, a characteristic of an erecting equal-magnification optical system is the ease with which the entire device can be made compact.

Erecting equal-magnification optical systems have been formed by inserting rodlike lenses such as Selfoc lenses (registered trademark, Nippon Sheet Glass) or rod lenses into opaque black resin in the form of an array. Since each lens has erecting equal-magnification properties, the erecting equal-magnification properties are maintained even after the lenses are arranged as an array.

By varying the refractive power from the center of the rod towards the periphery, the above-described Selfoc lenses or rod lenses are provided with light-harvesting properties. Since these lenses need to be manufactured with a special method as compared to regular lenses, manufacturing is difficult and expensive. An erecting equal-magnification optical system using a lens array plate with convex surfaces arranged in an array has therefore been proposed (see Patent Literature 1).

Furthermore, with an erecting equal-magnification optical system using Selfoc lenses, the depth of field is narrow. In an image reading device such as a scanner, by placing an object for which an image will be read on a cover glass that is maintained at a constant distance from the optical system, the distance between the object for which the image will be read and the optical system is maintained at a desired distance. By thus maintaining the distance between the object and the optical system at the desired distance, it is possible to read an image with little blurring even with a narrow depth of field.

Depending on the object to be read, however, the read surface might not be in close contact with the cover glass, but rather might be separated therefrom. In such a case, the read image is highly blurred due to the narrow depth of field. An erecting equal-magnification optical system with an expanded depth of field has therefore been proposed (see Patent Literature 2).

CITATION LIST

Patent Literature 1: JP2003-139911A
Patent Literature 2: JP2010-164974A

SUMMARY

With the erecting equal-magnification optical system in Patent Literature 1 or Patent Literature 2, however, the erecting equal-magnification optical system characteristics that are desired for an image reading device and image forming device are not sufficient.

Accordingly, the present invention has been conceived in light of the above problems and provides an erecting equal-magnification lens array unit that can expand the depth of field and that has the characteristics desired for an image reading device and image forming device which satisfy requirements for intended use.

In order to solve the above problems, an erecting equal-magnification lens array unit according to a first aspect includes: a first lens array including a plurality of first lenses, the first lenses being arranged along a first direction perpendicular to optical axes of the first lenses; and a second lens array including a plurality of second lenses, optical axes of the second lenses overlapping with optical axes of the first lenses, the second lenses being arranged along the first direction, such that each optical system formed by each first lens and each second lens with overlapping optical axes is an erecting equal-magnification optical system, each optical system is substantially telecentric on at least an object side, and the first lens array and the second lens array are connected so that an imaging position, by each first lens, of an object at a predetermined ideal distance from each optical system is positioned between the first lens array and the second lens array.

In an erecting equal-magnification lens array unit according to a second aspect, the expression $0.1 \times F < g < 2 \times \beta_1 \times F \times \phi$ is preferably satisfied, where g is an interval between the first lens and second lens, F is an F value of the optical system, and $\phi$ is a diameter of the second lens.

An erecting equal-magnification lens array unit according to a third aspect preferably further includes a light blocking portion, with an aperture, between each first lens and each second lens with overlapping optical axes, a diameter of the aperture at a side facing the first lens being smaller than a diameter of the aperture at a side facing the second lens, such that an inner surface of the aperture is surface treated to prevent reflection of light.

An erecting equal-magnification lens array unit according to a fourth aspect includes: a first lens array including a plurality of first lenses, the first lenses being arranged along a first direction perpendicular to optical axes of the first lenses; a second lens array including a plurality of second lenses, optical axes of the second lenses overlapping with optical axes of the first lenses, the second lenses being arranged along the first direction; and a light blocking portion, with an aperture, between each first lens and each second lens with overlapping optical axes, such that each optical system formed by each first lens and each second lens with overlapping optical axes is an erecting equal-magnification optical system, and the following expression is satisfied:

$$r_o + (s-1)p < \left(\frac{L_1}{L_0}\frac{1}{n} + 1\right)p < sp - r_o$$

where $r_o$ is a radius of the aperture at a side of the first lens, p is a pitch between adjacent first lenses, $L_0$ is a predetermined object distance from the first lens to an object surface, $L_1$ is a thickness of the first lens, n is a refractive index of the first lens, and s is any integer.

In an erecting equal-magnification lens array unit according to a fifth aspect, a diameter of the aperture at a side facing the first lens is preferably smaller than a diameter of the aperture at a side facing the second lens.

In an erecting equal-magnification lens array unit according to a sixth aspect, an inner surface of the aperture is preferably surface treated to prevent reflection of light.

An erecting equal-magnification lens array unit according to a seventh aspect includes: a first lens array including a plurality of first lenses, the first lenses being arranged along a first direction perpendicular to optical axes of the first lenses; a second lens array including a plurality of second lenses, optical axes of the second lenses overlapping with optical axes of the first lenses, the second lenses being arranged along the first direction; and a light blocking portion, with an aperture, between each first lens and each second lens with overlapping optical axes, the light blocking portion being near a second surface of the first lens, such that each optical system formed by each first lens, the aperture, and each second lens with overlapping optical axes is an erecting equal-magnification optical system, and the following expression is satisfied:

$$\left| \frac{r_{11}}{L_1} - \frac{n-1}{n} \right| \leq 0.2$$

where $r_{11}$ is a curvature radius of a first surface of the first lens, $L_1$ is a thickness of the first lens, and n is a refractive index of the first lens.

In order to solve the above problems, an erecting equal-magnification lens array unit according to an eighth aspect includes: a first lens array including a plurality of first lenses, the first lenses being arranged along a first direction perpendicular to optical axes of the first lenses; a second lens array including a plurality of second lenses, optical axes of the second lenses overlapping with optical axes of the first lenses, the second lenses being arranged along the first direction; and a light blocking portion, with an aperture, between each first lens and each second lens with overlapping optical axes, such that each optical system formed by each first lens and each second lens with overlapping optical axes is an erecting equal-magnification optical system, each optical system is substantially telecentric on at least an object side, and the following expressions are satisfied:

$$\frac{n \times L_{12}}{L_1} < 1$$

$$(n-1)\frac{L_{12}}{r_{11}} < 1$$

where $r_{11}$ is a curvature radius of a first surface of the first lens, $L_1$ is a thickness of the first lens, $L_{12}$ is an interval between the first lens and second lens, and n is a refractive index of the first lens.

In an erecting equal-magnification lens array unit according to a ninth aspect, the following expression is preferably satisfied:

$$0.03 < \frac{r_{11}}{L_{total}}$$

where $L_{total}$ is a distance between object images.

In an erecting equal-magnification lens array unit according to a tenth aspect, the first lens is preferably an optical reduction system, and the second lens is preferably an optical expansion system.

An image reading device according to an eleventh aspect includes an erecting equal-magnification lens array unit that includes: a first lens array including a plurality of first lenses, the first lenses being arranged along a first direction perpendicular to optical axes of the first lenses; and a second lens array including a plurality of second lenses, optical axes of the second lenses overlapping with optical axes of the first lenses, the second lenses being arranged along the first direction, such that each optical system formed by each first lens and each second lens with overlapping optical axes is an erecting equal-magnification optical system, each optical system is substantially telecentric on at least an object side, and the first lens array and the second lens array are connected so that an imaging position, by each first lens, of an object at a predetermined ideal distance from each optical system is positioned between the first lens array and the second lens array.

In order to solve the above problems, an image forming device according to a twelfth aspect includes an erecting equal-magnification lens array unit that includes: a first lens array including a plurality of first lenses, the first lenses being arranged along a first direction perpendicular to optical axes of the first lenses; and a second lens array including a plurality of second lenses, optical axes of the second lenses overlapping with optical axes of the first lenses, the second lenses being arranged along the first direction, such that each optical system formed by each first lens and each second lens with overlapping optical axes is an erecting equal-magnification optical system, each optical system is substantially telecentric on at least an object side, and the first lens array and the second lens array are connected so that an imaging position, by each first lens, of an object at a predetermined ideal distance from each optical system is positioned between the first lens array and the second lens array.

According to the erecting equal-magnification lens array unit of the present invention with the above structure, it is possible to satisfy requirements for intended use.

BRIEF DESCRIPTION OF DRAWINGS

The present invention will be further described below with reference to the accompanying drawings, wherein:

FIG. 2 is a cross-sectional diagram of the image reading unit along a plane perpendicular to the main scanning direction in FIG. 1;

FIG. 10 illustrates the change in imaging position along the image surface when the object surface is displaced from the ideal position in a conventional erecting equal-magnification lens array unit;

FIG. 14 is an aberration diagram illustrating spherical aberration, astigmatic aberration, and distortion aberration of the first lens when a second surface of the first lens is planar in Embodiment 4;

DESCRIPTION OF EMBODIMENTS

With reference to the drawings, the following describes embodiments of an erecting equal-magnification lens array unit to which the present invention is applied.

Figure 1:
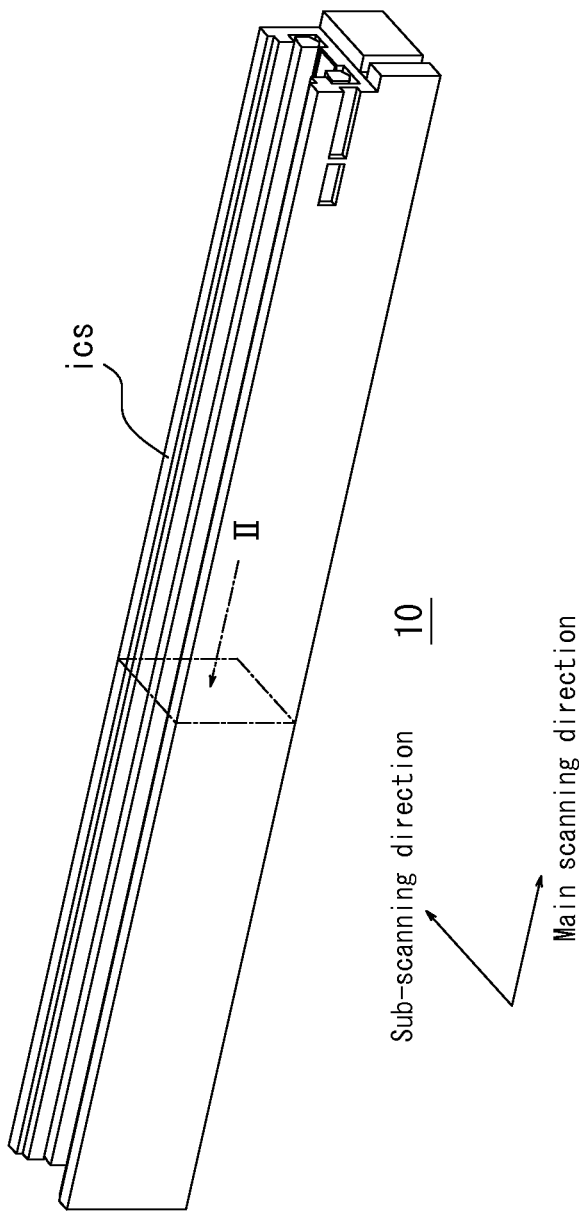
FIG. 1 is a perspective view illustrating the outer appearance of an image reading unit having an erecting equal-magnification lens array unit according to Embodiment 1 of the present invention.

FIG. 1 is a perspective view of an image reading unit that includes an erecting equal-magnification lens array unit according to Embodiment 1 of the present invention. An image reading unit 10 is provided in an image scanner (not illustrated). The image reading unit 10 can read an image, in a straight line along a main scanning direction, of a subject (not illustrated) placed on an image reading surface ics. By consecutively reading the image in a straight line while displacing the image reading unit 10 in a sub-scanning direction perpendicular to the main scanning direction, a 2D image of the subject is read.

Next, with reference to FIG. 2, the structure of the image reading unit 10 is described. FIG. 2 schematically illustrates a cross-section of the portion indicated by an alternate long and short dash line in FIG. 1, in a plane perpendicular to the main scanning direction. Unlike FIG. 1, a cover glass 11 is provided. Note that in FIG. 2, the direction from the background toward the foreground is the main scanning direction, the direction from the left to the right is the sub-scanning direction, and the direction from the top to the bottom is the optical axis direction.

The image reading unit 10 includes a cover glass 11, an illumination system 12, an erecting equal-magnification lens array unit 13, an image sensor 14, and a position regulating member 15. The cover glass 11, illumination system 12, erecting equal-magnification lens array unit 13, and image sensor 14 are fixed by the position regulating member 15 so that their relative positions and orientations are maintained in the states described below.

A hole 16 is formed in the position regulating member 15. The hole 16 includes a first chamber c1 and a second chamber c2. The first chamber c1 is formed to have a greater width in the sub-scanning direction than that of the second chamber c2.

The cover glass 11 covers the end of the hole 16 at the side of the first chamber c1. The illumination system 12 is placed in the first chamber c1. Note that the illumination system 12 is placed at a position that does not overlap the second chamber c2 when viewed from the optical axis direction. The illumination system 12 is established so that illumination light emitted by the illumination system 12 is emitted in the direction of the cover glass 11. In other words, the orientation and position are determined for a light source (not illustrated) or illumination optical system (not illustrated) with which the illumination system 12 is configured.

The erecting equal-magnification lens array unit 13 is inserted in the second chamber c2. The image sensor 14 is fixedly attached to the end of the hole 16 at the side of the second chamber c2.

Note that orientations are adjusted so that a normal line to the plane of the cover glass 11 is parallel to the optical axis of each optical system (not illustrated in FIG. 2) provided in the erecting equal-magnification lens array unit 13, and so that a normal line to the receiving surface of the image sensor 14 is parallel to the optical axis direction.

In the above-described structure, illumination light emitted from the illumination system 12 strikes the subject (not illustrated) through the cover glass 11. Reflected light due to the subject reflecting the illumination light passes through the cover glass 11. The reflected light from the subject forms an image on the receiving surface of the image sensor 14 via the erecting equal-magnification lens array unit 13. The formed optical image is captured by the image sensor 14, and an image signal, which is an electrical signal, is generated.

Note that the image sensor 14 is a CCD line sensor, a CMOS line sensor, or the like and generates a 1D image signal. The generated 1D image signal is transmitted to a signal processing circuit (not illustrated), and predetermined image processing is applied thereto. By generating 1D image signals for a plurality of frames generated while displacing the image reading unit 10, a 2D image signal is generated.

Figure 3:
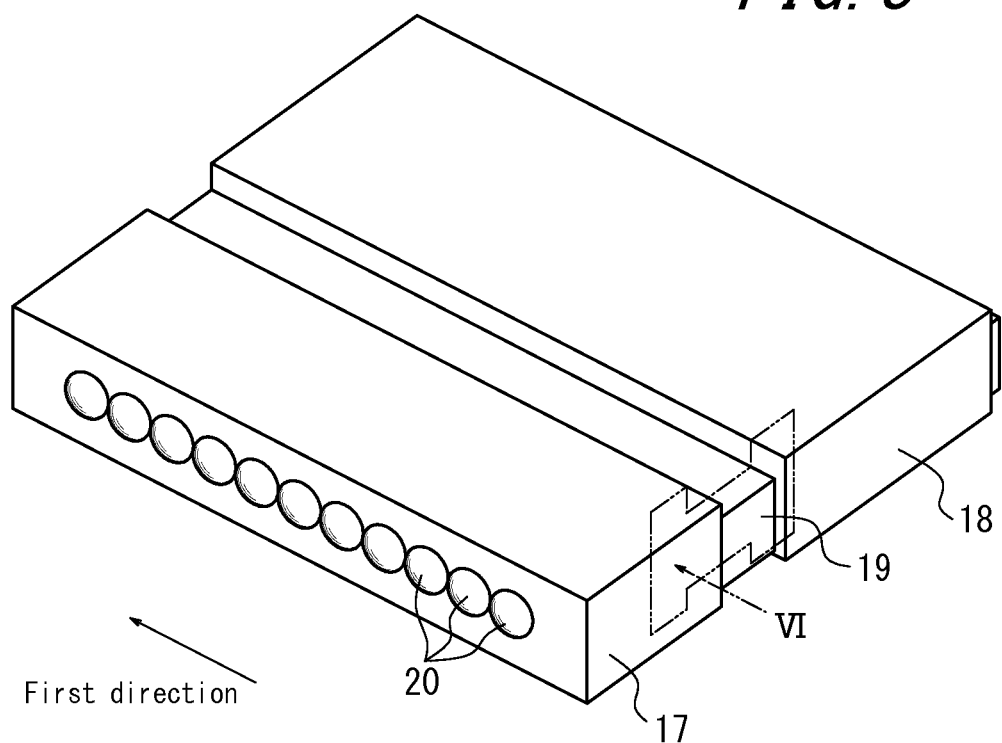
FIG. 3 is a perspective view illustrating the outer appearance of the erecting equal-magnification lens array unit.

Next, the structure of the erecting equal-magnification lens array unit 13 is described in detail with reference to FIG. 3. The erecting equal-magnification lens array unit 13 is configured with a first lens array 17, a second lens array 18, and a connecting portion 19 (light blocking portion).

A plurality of first lenses 20 are provided in the first lens array 17. The orientations of the first lenses 20 are determined so that the optical axes thereof are parallel to each other. Furthermore, the first lenses 20 are arranged to be in close contact to each other along a first direction perpendicular to the optical axes of the first lenses 20.

A plurality of second lenses 21 (see FIG. 2) are provided in the second lens array 18. The orientations of the second lenses 21 are determined so that the optical axes thereof are parallel to each other. Furthermore, the second lenses 21 are arranged in a line along a direction perpendicular to the optical axes of the second lenses 21.

The first lens array 17 and the second lens array 18 are connected by the connecting portion 19. The positions of the first lens array 17 and the second lens array 18 are aligned so that the optical axis of each first lens 20 overlaps with the optical axis of one of the second lenses 21.

A plurality of light-transmitting holes 22 (apertures) are formed in the connecting portion 19. The light-transmitting holes 22 penetrate from each of the first lenses 20 to the second lenses 21. Note that the surface of the connecting portion 19 at the side of the first lens 20 functions as a diaphragm, blocking light entering from a surface other than the light-transmitting hole 22. Accordingly, the first lens 20, light-transmitting hole 22, and second lens 21 form a unit optical system 23.

The first lenses 20 and the second lenses 21 are designed and the unit optical systems 23 are structured so that each unit optical system 23 is an erecting equal-magnification optical system and is substantially telecentric on the object side. The condition of being substantially telecentric is described below.

In Embodiment 1, a first surface of each first lens 20 and both surfaces of each second lens 21 are formed to be convex surfaces, so that the unit optical systems 23 are provided with erecting equal-magnification properties. A second surface of each first lens 20 may be convex, concave, or flat.

Furthermore, each unit optical system 23 is designed and formed so that Expression (1) below is satisfied.

$$0.5 \leq y_0/D \leq 1.0 \quad (1)$$

Figure 4:
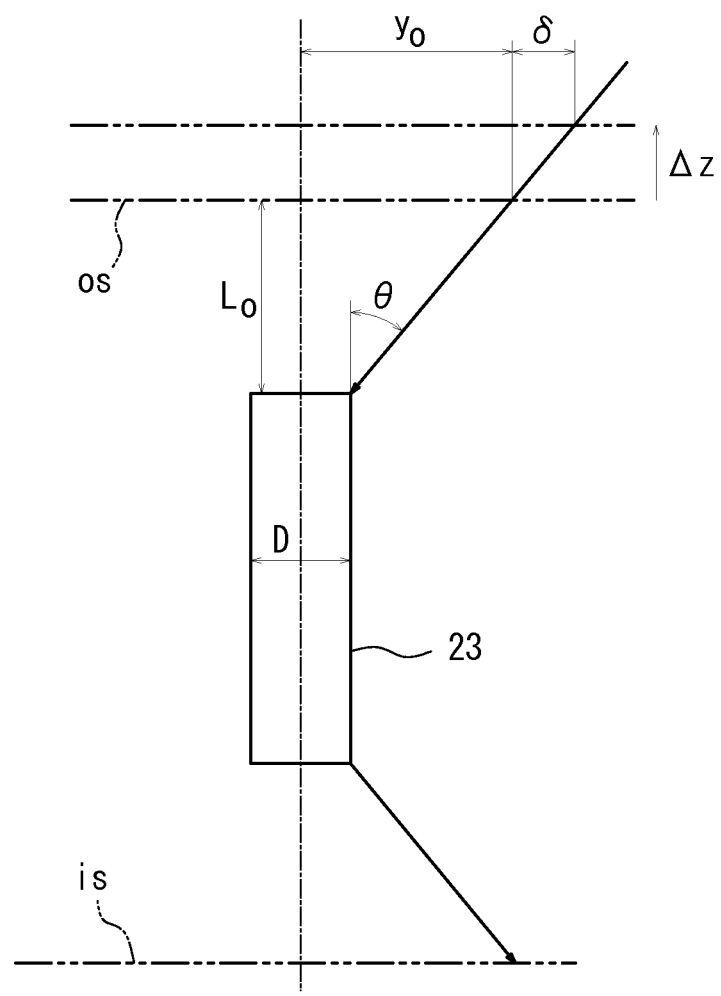
FIG. 4 illustrates the positional relationships between a unit optical system, an image surface, and an object surface.

As illustrated in FIG. 4, $y_0$ is the field of view radius of the unit optical system 23, i.e. the radius of the range on the object surface os of light that can be captured by the unit optical system 23. The distance $L_0$ from the unit optical system 23 to the object surface os is determined in advance, and the image scanner is formed so that the distance from the glass surface, on which lies a document that is to be scanned, to the unit optical system 23 is the determined distance $L_0$. D is the diameter of the unit optical system 23.

Furthermore, each unit optical system 23 is designed and formed so that Expression (2) below is satisfied.

$$D/(8 \times L_0) < \tan \theta_g \quad (2)$$

Figure 5:
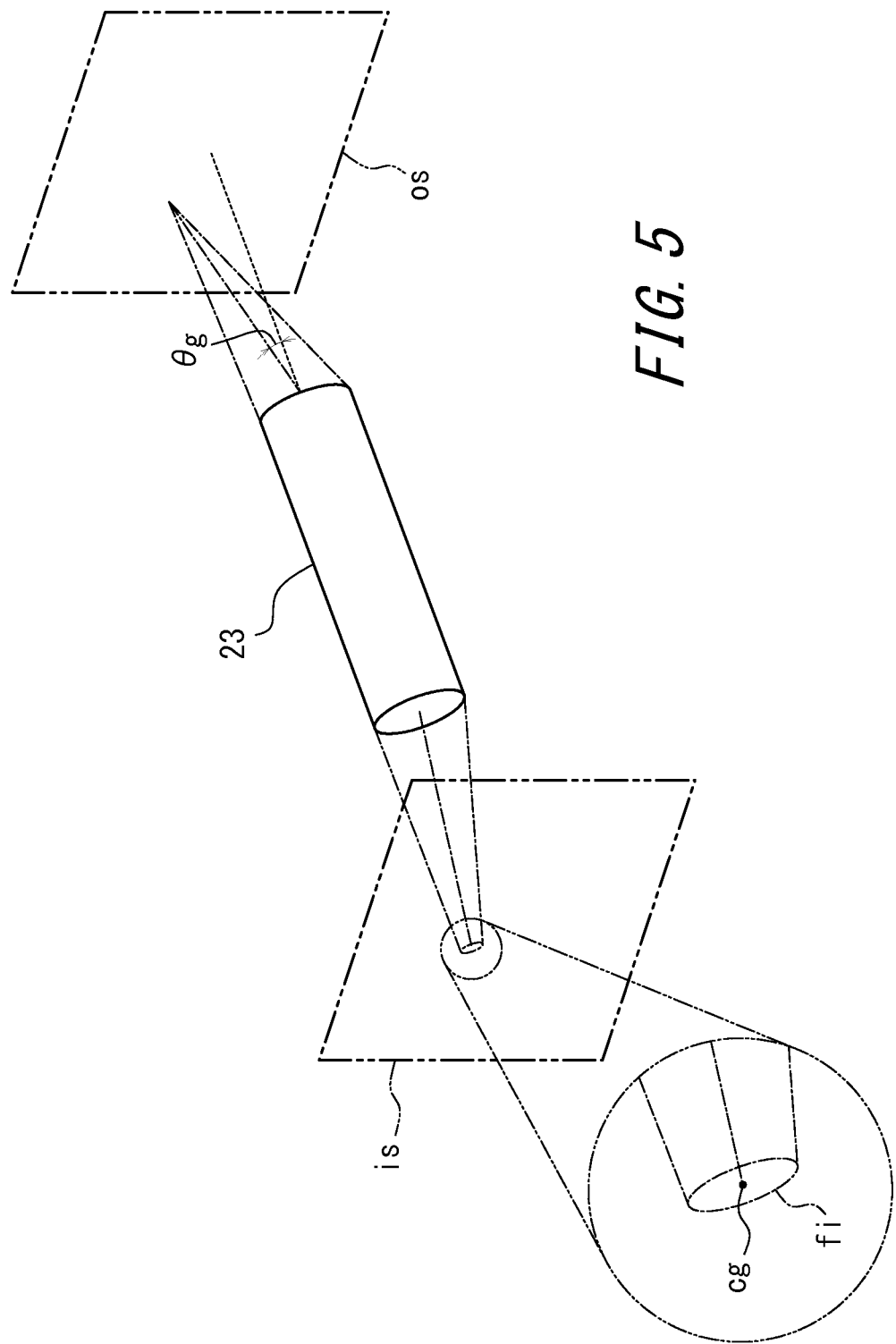
FIG. 5 illustrates the definition of $\theta_g$ with respect to the unit optical system.

Here, $L_0$ is a predetermined object distance from the unit optical system 23 to the object surface os. As illustrated in FIG. 5, $\theta_g$ is the angle of incidence into the unit optical system 23 of a light ray that passes through the center of gravity cg of a fine optical image fi, which is an image formed on an image surface is by the unit optical system 23 for a point on the object surface os.

Furthermore, in order to be substantially telecentric, each unit optical system 23 is designed and formed so that Expression (3) below is satisfied.

$$\tan \theta_g < \delta/\Delta z \quad (3)$$

Here, $\delta$ is an allowable image shift amount determined in advance for the unit optical system 23. When the object is displaced by the depth of field $\Delta z$ from the unit optical system 23, the image shift amount refers to the amount of displacement, in a direction perpendicular to the optical axis of the unit optical system 23, of a point on the object surface that causes an image to form at any point on the image surface.

For example, when using the erecting equal-magnification lens array unit 13 as a photography optical system of the image sensor 14, if the image shift amount $\delta$ is equal to or less than the pixel pitch, then no blurring will be noticeable in the captured image as a result of misalignment of formed image points on the image surface corresponding to the same point on the object due to different unit optical systems 23. Accordingly, the allowable image shift amount $\delta$ is determined in accordance with the image sensor, light receiver, or the like that is used, or in accordance with the amount of misalignment that can be perceived by humans.

Next, the interval between the first lens array 17 and the second lens array 18 is described. The first lenses 20 and the interval between the first lenses 20 and the second lenses 21 are designed so that, due to the first lenses 20, an image of an object is formed in the space between the first lenses 20 and the second lenses 21.

Figure 6:
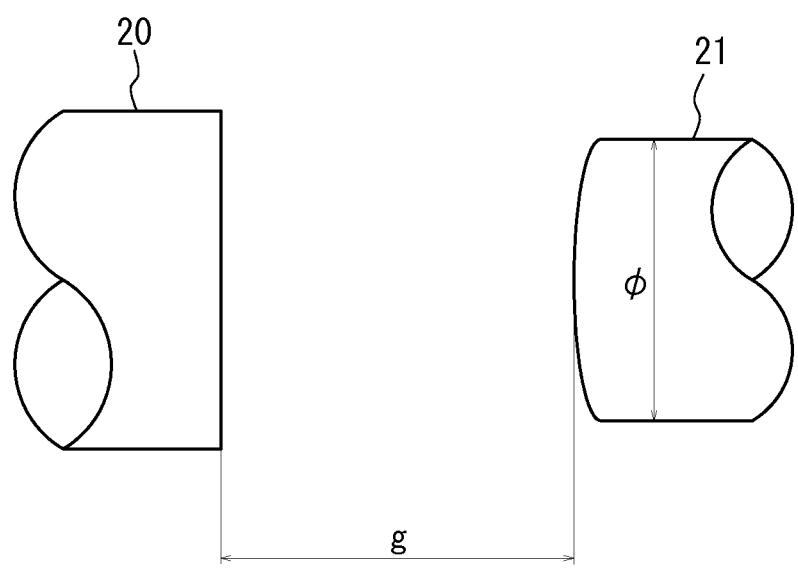
FIG. 6 is a partial enlarged view of the unit optical system in order to illustrate the interval between a first lens and a second lens.

Furthermore, as illustrated in FIG. 6, the erecting equal-magnification lens array unit 13 is formed by designing the second surface of each first lens 20 and an interval g between the second surface of the first lens 20 and a second surface of the second lens 21 facing the second surface of the first lens 20 to satisfy Expression (4) below.

$$0.1 \times F < g < 2 \times \beta_{11} \times F \times \phi \quad (4)$$

In Expression (4), F is the F value of the unit optical system 23, and $\phi$ is the diameter of the second lens 21.

Figure 7:
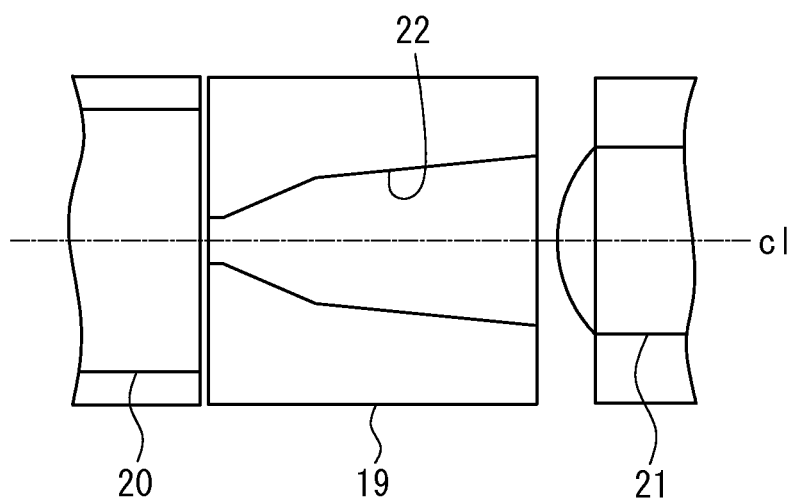
FIG. 7 is a partial cross-sectional diagram of the unit optical system along a plane perpendicular to the first direction in FIG. 3.

Next, the shape of the light-transmitting holes 22 is described. As illustrated in FIG. 7, the inner surface of each light-transmitting hole 22 is formed along the edge of two consecutive circular truncated cones having the same center line cl. The light-transmitting holes 22 are formed so that the diameter of each light-transmitting hole 22 at the first lens 20 side is smaller than the diameter at the second lens 21 side. The formation position of each light-transmitting hole 22 is determined so that the center line cl overlaps the optical axis of the first lens 20 and the second lens 21.

Furthermore, treatment to suppress reflection of light or treatment to absorb light is applied to the inner surface of each light-transmitting hole 22. Examples of treatment to suppress reflection of light include treatment to roughen the surface by sandblasting or the like, referred to as surface texturing, and treatment to suppress the progress of reflected light rays by forming the surface in a screw shape. Examples of treatment to absorb light include applying light-absorbing paint to the inner surface.

According to the erecting equal-magnification lens array unit of Embodiment 1 with the above structure, the imaging position due to the first lens 20 is positioned between the first lens 20 and the second lens 21, thus making it possible to reduce the influence that foreign material has on an image. The reduction of the influence on the image is described below.

Figure 8:
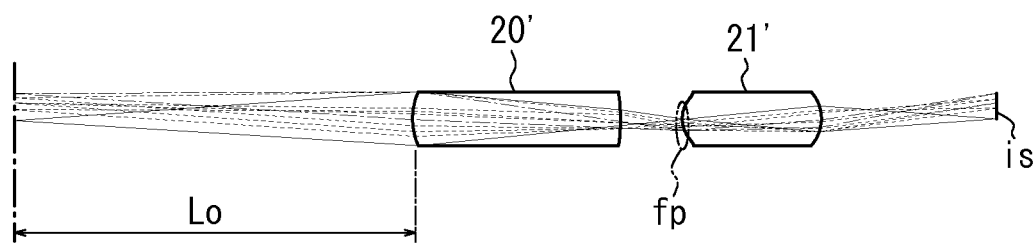
FIG. 8 is a light path diagram of a unit optical system, illustrating the intermediate imaging position for a unit optical system formed without taking the intermediate imaging position into consideration.

In an erecting equal-magnification optical system using two lenses, as illustrated in FIG. 8, an object placed at an object distance $L_0$, for which the distance from the first surface of the first lens 20' is determined, might be imaged on or near the first surface of the second lens 21' by the first lens 20' (see reference sign fp). The width of the subject light beam becomes narrower closer to the imaging position. If foreign material is located at a position where the subject light beam is narrow, the amount of light that reaches the image surface is becomes drastically reduced. Therefore, when there is foreign material at the imaging position of the first lens 20', the influence on the image is maximized.

Figure 9:
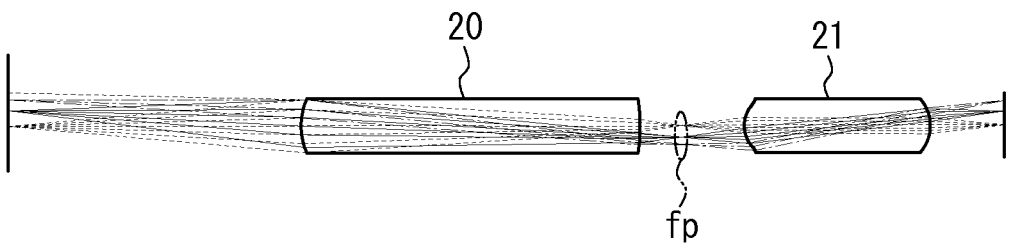
FIG. 9 is a light path diagram of a unit optical system, illustrating the intermediate imaging position for the unit optical system according to Embodiment 1.

Accordingly, by forming the first lens 20 and adjusting the interval between the first lens 20 and the second lens 21 so that the imaging position due to the first lens 20 (see reference sign fp) is between the second surface of the first lens 20 and the first surface of the second lens 21, as in Embodiment 1, the influence that foreign material has on an image is reduced (see FIG. 9).

Furthermore, in Embodiment 1, the first lens array 17 and the second lens array 18 are connected so that Expression (4) is satisfied, thereby allowing for a reduction of the influence that foreign material, such as dirt on the unit optical system 23, has on the image. The reduction of the influence of dirt or the like due to Expression (4) is described below in detail.

The diameter $\epsilon$ of the light beam at a position that is a distance of g'/2 from the intermediate imaging position in the direction of the optical axis is represented by Expression (5) below, where the intermediate imaging position of the unit optical system 23, i.e. the F value of the primary imaging system up to the imaging position of the first lens 20, is $F_1$.

$$\varepsilon = \frac{g'}{2 \times F_1} \tag{5}$$

By manipulating Expression (5), the distance g' from the imaging position at which the diameter of the light beam becomes $\epsilon$ in the optical system for which the F value is $F_1$ is calculated by Expression (6) below.

$$g'=2\times\epsilon\times F_1 \tag{6}$$

The F value of the primary imaging system is calculated with Expression (7) below, using a magnification $\beta_1$ of the primary imaging system.

$$F_1=\beta_1\times F \tag{7}$$

Normally, when forming an erecting equal-magnification optical system using two lenses, the lenses are designed for reduction by the primary imaging system and enlargement by the secondary imaging system. If the magnification $\beta_1$ of the primary imaging system is made too small, however, various aberrations due to enlargement by the secondary imaging system are also greatly enlarged. Therefore, typically $\beta_1$ is preferably designed to be at least 0.3. Accordingly, in Embodiment 1 as well, the first lens 20 is designed so that Expression (8) below is satisfied.

$$F_1>0.3\times F \tag{8}$$

In order to prevent foreign material from influencing an image, the area of the light beam at the position of the foreign material needs to be at least 10 times the area of the foreign material. In the manufacturing process of the erecting equal-magnification lens array unit 13, any foreign material exceeding 0.05 mm in size is detected by visual inspection for foreign material with a microscope and is removed. In other words, foreign material of up to 0.05 mm in size may remain. Therefore, the diameter $\epsilon$ of the light beam preferably satisfies Expression (9) below.

$$\pi \times \left(\frac{\varepsilon}{2}\right)^2 \times 0.1 > 0.05^2 \tag{9}$$

By manipulating Expression (9), the diameter $\epsilon$ of a light beam that reduces the relative influence of foreign material that fails to be detected satisfies Expression (10) below.

$$\epsilon>0.18 \tag{10}$$

Based on Expressions (6), (8), and (10), the distance g'/2 from the intermediate imaging position preferably satisfies Expression (11) below in order to reduce the relative influence of dirt.

$$g'/2>0.05\times F \tag{11}$$

Foreign material may attach to the second surface of the first lens 20 and the first surface of the second lens 21. Therefore, the intermediate imaging position is preferably at a distance of g'/2 from either surface. Accordingly, the interval g between the second surface of the first lens 20 and the first surface of the second lens 21 is preferably g' or greater. By satisfying the expression 0.1×F<g, the influence of foreign material on an image can therefore be further reduced.

Note that even when the expression 0.1×F<g is satisfied, if the diameter of the second lens 21 is smaller than the diameter of the light beam that satisfies Expression (10), the fraction occupied by the foreign material in the diameter of the light beam emitted by the unit optical system 23 increases. Therefore, the diameter $\epsilon$ of the light beam needs to be smaller than the diameter of the second lens 21. Expression (12) below thus holds.

$$\frac{g}{2\times F_1} < \phi \tag{12}$$

Manipulating Expression (12) yields Expression (13).

$$g<2\times F_1\times\phi \tag{13}$$

Expression (14) below is derived from Expressions (7) and (13).

$$g<2\times\beta_1\times F\times\phi \tag{14}$$

In this way, by designing and forming the second lens 21 so that Expression (14) is satisfied, the entirety of a light beam of sufficient size can strike the second lens 21, thus making it possible to increase the effect of reducing the influence of foreign material on an image.

In Embodiment 1, since the diameter of each light-transmitting hole 22 at the first lens 20 side is smaller than the diameter at the second lens 21 side, stray light from the first lens 20 of another unit optical system 23 can be prevented from striking the second lens 21.

Among the first lenses 20 in close contact with one another, stray light might enter from the lateral surface or the like of an adjacent first lens 20. Due to the intermingling of such stray light, the influence of noise on the formed image increases. As in Embodiment 1, however, stray light can be inhibited by using the light-transmitting holes 22 to suppress stray light from entering the second lenses 21, thus making it possible to reduce the influence of noise on the image.

In Embodiment 1, treatment to suppress reflection of light or treatment to absorb light is applied to the inner surface of the light-transmitting hole 22. Therefore, propagation to the second lens 21 of stray light that passes through the aperture at the first lens 20 side and strikes the inner surface of the light-transmitting hole 22 can be prevented.

In Embodiment 1, an erecting equal-magnification lens array unit formable using regular lenses and having an expanded depth of field for the array as a whole can be formed. The effect of expanding the depth of field for the array as a whole is described in detail below.

As illustrated in FIG. 10(a), in a conventional erecting equal-magnification lens array unit 13', for an object placed at a position on an object surface os that is ideal with respect to the distance to the image surface is, an erected image is formed at equal magnification on the image surface is by each unit optical system 23'. The images formed by the plurality of unit optical systems 23' are output as one overall image, without any misalignment (see FIG. 10(a)).

As illustrated in FIG. 10(b), however, by displacing the object surface os from the ideal position, the equal-magnification properties of the image surface is of each unit optical system 23' degenerate, and the imaging position on the image surface is for the same point on the object surface os differs between adjacent unit optical systems 23'. Therefore, the image output by the erecting equal-magnification lens array unit 13' as a whole is distorted. Accordingly, the depth of field of the erecting equal-magnification lens array unit as a whole becomes shallower.

In general, as the angle of incidence of the main light ray at the object side increases, the change in magnification of the lens with respect to displacement of the object surface increases. In the erecting equal-magnification lens array unit as a whole, the misalignment between imaging positions, by adjacent lenses, for the same point on the object surface increases as the change in magnification increases.

Therefore, ideally, if the angle of incidence of the main light ray is zero, the magnification does not change with respect to displacement of the object surface. Accordingly, even if the object surface is displaced from the ideal position, the imaging position by different lenses for a point on the object surface is maintained at the same position on the image surface without shifting. In other words, if each optical system forming the lens array is object-side telecentric, a deep depth of field for the lens array as a whole can be maintained. In this way, with the erecting equal-magnification lens array unit 13 of Embodiment 1, the depth of field for the lens array as a whole can be made deeper.

According to Embodiment 1, the first lenses 20 are arranged to be in close contact to each other along the first direction. This structure allows for the formation of an image without gaps along the first direction.

In Embodiment 1, as described above, each unit optical system 23 is substantially telecentric on the object side, and therefore the amount of transmitted light from a point located outside of the diameter of the unit optical system 23 is low. Therefore, if there is a space between adjacent unit optical systems 23, the image for points on the object surface os along an extension of the space becomes extremely dark, which may cause the image to have gaps. However, as described above, the first lenses 20 are in close contact along the first direction, and therefore such spaces do not exist, making it possible to achieve an image without gaps along the first direction.

According to Embodiment 1, the unit optical systems 23 are formed so that $0.5 \leq y_0/D$. Therefore, all of the points on the object surface can be included in the area of the field of view of one of the unit optical systems 23, thus preventing a partial gap in the image.

As $y_0/D$ increases, however, an object surface separated at a distance from the optical axis becomes included in the area of the field of view of the unit optical system 23. Therefore, if $y_0/D$ increases, the number of unit optical systems 23 that form an image for a point on the object surface increases, thereby increasing the influence of misalignment between images formed by different unit optical systems 23.

To address this issue, in Embodiment 1, the unit optical systems 23 are formed so that $y_0/D \leq 1$. Therefore, by limiting the number of unit optical systems 23 that form an image for a point on the object surface to being two or less, the influence of misalignment between images can be reduced.

In Embodiment 1, each unit optical system 23 is formed so that Expression (2) ($D/8L_0 < \tan \theta_g$) is satisfied, and therefore as explained below, unevenness in the brightness can be suppressed.

As is known, an image by an optical system such as a lens is brightest where the image surface and the optical axis intersect and becomes darker with distance from the optical axis. Therefore, unevenness in brightness occurs in the formed image. In the case of a digital camera, the unevenness in brightness can be reduced by changing the amplification factor for each region of the image.

When the amount of light in a region distant from the optical axis is extremely low, however, the amplification factor needs to be set large, resulting in a large influence from noise. Therefore, the ratio of the amount of light to the amount of light along the optical axis is preferably set to exceed approximately 50% at any position.

In the case of the erecting equal-magnification lens array unit 13 in Embodiment 1, it suffices to obtain an amount of light exceeding approximately 50% by combining the light beams that pass through two adjacent unit optical systems 23. Therefore, it suffices to attain an amount of light exceeding approximately 25% from a single unit optical system 23. If the angle of incidence $\theta_g$ satisfies Expression (15) below, it is possible to transmit an amount of light exceeding 25% in the vicinity of the optical axis at any position within the field of view of a single unit optical system 23.

$$\frac{\frac{D}{2}}{L_0} \times 0.25 < \tan \theta_g \tag{15}$$

The left side of Expression (15) is $D/8L_0$, and each unit optical system 23 is formed so that Expression (2) is satisfied. Therefore, unevenness in the brightness can be suppressed to the point at which compensation by amplification is possible.

In Embodiment 1, each unit optical system 23 is formed so that Expression (3) ($\tan \theta_g < \delta/\Delta z$) is satisfied. In other words, the unit optical system 23 is designed so that the angle calculated by the allowable image shift amount $\delta$ and the allowable depth of field $\Delta z$ becomes the maximum angle for $\theta_g$.

As described above, this condition is the condition that the unit optical system 23 be substantially telecentric on the object side. By satisfying such a condition, the misalignment between imaging positions in images formed by adjacent unit optical systems 23 can be suppressed enough to make visual confirmation difficult.

Next, defining the ratio of the field of view radius $y_0$ to the diameter D of the unit optical system 23, i.e. $y_0/D$, as a degree of overlap m, the relationship between the degree of overlap m and the image shift amount $\delta$ is described with reference to numerical values. Expressions (16) and (17) below hold, where the angle of incidence of light emitted from any point on the object surface is $\theta$.

$$\tan\theta = \frac{y_0 - \frac{D}{2}}{L_0} \quad (16)$$

$$\tan\theta = \frac{\delta}{\Delta z} \quad (17)$$

Expression (18) below is derived from Expressions (16) and (17) and m.

$$\delta = \frac{\Delta z \times D \times \left(m - \frac{1}{2}\right)}{L_0} \quad (18)$$

Figure 11:
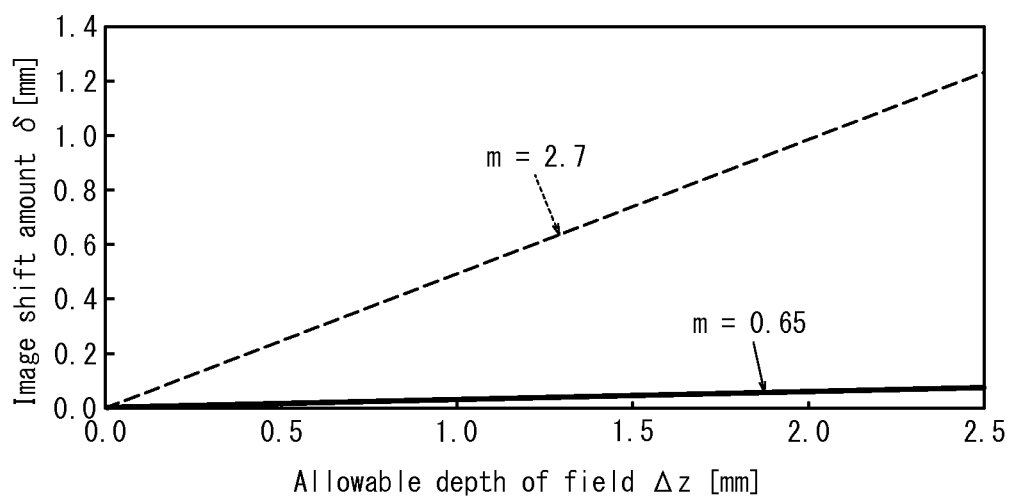
FIG. 11 is a graph showing the relationship between depth of field and allowable image shift amount in order to illustrate the change in image shift amount due to a difference in degree of overlap.

As is clear from Expression (18), as the degree of overlap m varies from ½, the image shift amount δ increases. FIG. 11 illustrates the relationship between the depth of field Δz and the image shift amount δ using the examples of m=0.65 and m=2.7. Note that D=2.0 and $L_0$=9.

As the image shift amount δ increases, the resolution of the erecting equal-magnification lens array unit 13 as a whole decreases, resulting in an increased misalignment between imaging positions formed by adjacent unit optical systems 23 for the same point on the object surface. As illustrated in FIG. 11, for the same depth of field Δz, the image shift amount δ is smaller when m=0.65 than when m=2.7. Accordingly, it is clear that as the difference between m and ½ increases, the misalignment of imaging positions increases.

For example, for a pixel pitch of 0.05 mm in the image sensor 14, used as an example of allowable image shift amount, the depth of field Δz is 0.1 mm when m=2.7. On the other hand, when m=0.65, the depth of field Δz is 0.65 mm. It is thus clear that the depth of field Δz determined based on the allowable image shift amount is deeper as the degree of overlap m is closer to ½.

Next, Embodiment 2 of the present invention is described. In Embodiment 2, the structure of the light-transmitting holes differs from Embodiment 1. Embodiment 2 is described below, focusing on the differences from Embodiment 1. Note that portions having the same function and structure as in Embodiment 1 are provided with the same reference signs. The structure and functions of the image reading unit in Embodiment 2 are the same as in Embodiment 1 (see FIGS. 1 and 2).

Next, the structure of the erecting equal-magnification lens array unit 13 in Embodiment 2 is described in detail. The erecting equal-magnification lens array unit 13 is configured with the first lens array 17, the second lens array 18, and the connecting portion 19 (light blocking portion), as in Embodiment 1 (see FIG. 3).

As in Embodiment 1, a plurality of the first lenses 20 are provided in the first lens array 17. The orientations of the first lenses 20 are determined so that the optical axes thereof are parallel to each other. Furthermore, the first lenses 20 are arranged to be in close contact to each other along a first direction perpendicular to the optical axes of the first lenses 20.

As in Embodiment 1, a plurality of the second lenses 21 (see FIG. 2) are provided in the second lens array 18. The orientations of the second lenses 21 are determined so that the optical axes thereof are parallel to each other. Furthermore, the second lenses 21 are arranged in a line along a direction perpendicular to the optical axes of the second lenses 21.

As in Embodiment 1, the first lens array 17 and the second lens array 18 are connected by the connecting portion 19. The positions of the first lens array 17 and the second lens array 18 are aligned so that the optical axis of each first lens 20 overlaps with the optical axis of one of the second lenses 21.

As in Embodiment 1, a plurality of the light-transmitting holes 22 (apertures) are formed in the connecting portion 19. The light-transmitting holes 22 penetrate from each of the first lenses 20 to the second lenses 21. Note that the surface of the connecting portion 19 at the side of the first lens 20 functions as a diaphragm, blocking light entering from a surface other than the light-transmitting hole 22. Accordingly, the first lens 20, light-transmitting hole 22, and second lens 21 form a unit optical system 23.

As in Embodiment 1, the first lenses 20 and the second lenses 21 are designed and the unit optical systems 23 are structured so that each unit optical system 23 is an erecting equal-magnification optical system and is substantially telecentric on the object side. The condition of being substantially telecentric is described below.

As in Embodiment 1, a first surface of each first lens 20 and both surfaces of each second lens 21 are formed to be convex surfaces, so that the unit optical systems 23 are provided with erecting equal-magnification properties. A second surface of each first lens 20 may be convex, concave, or flat.

As in Embodiment 1, each unit optical system 23 is designed and formed so that Expression (1) is satisfied.

Furthermore, as in Embodiment 1, each unit optical system 23 is designed and formed so that Expression (2) is satisfied.

As in Embodiment 1, in order to be substantially telecentric, each unit optical system 23 is designed and formed so that Expression (3) is satisfied.

As in Embodiment 1, the inner surface of each light-transmitting hole 22 is formed along the edge of two consecutive circular truncated cones having the same center line cl (see FIG. 7). The light-transmitting holes 22 are formed so that the diameter of each light-transmitting hole 22 at the first lens 20 side is smaller than the diameter at the second lens 21 side. The formation position of each light-transmitting hole 22 is determined so that the center line cl overlaps the optical axis of the first lens 20 and the second lens 21.

In particular, the radius $r_o$ corresponding to the diameter of the light-transmitting hole 22 at the first lens 20 side is set to a value that yields an integer s satisfying Expression (19) below.

$$r_o + (s-1)p < \left(\frac{L_1}{L_0}\frac{1}{n} + 1\right)p < sp - r_o \quad (19)$$

In Expression (19), $r_o$ is the radius of the light-transmitting holes 22 at the first lens 20 side,
p is the pitch (distance) between adjacent first lenses 20,
$L_1$ is the thickness of the first lens 20, and
n is the refractive index of the first lens 20.

Furthermore, as in Embodiment 1, treatment to suppress reflection of light or treatment to absorb light is applied to the inner surface of each light-transmitting hole 22. Examples of treatment to suppress reflection of light include treatment to roughen the surface by sandblasting or the like, referred to as surface texturing, and treatment to suppress the progress of reflected light rays by forming the surface in a screw shape. Examples of treatment to absorb light include applying light-absorbing paint to the inner surface.

Figure 12:
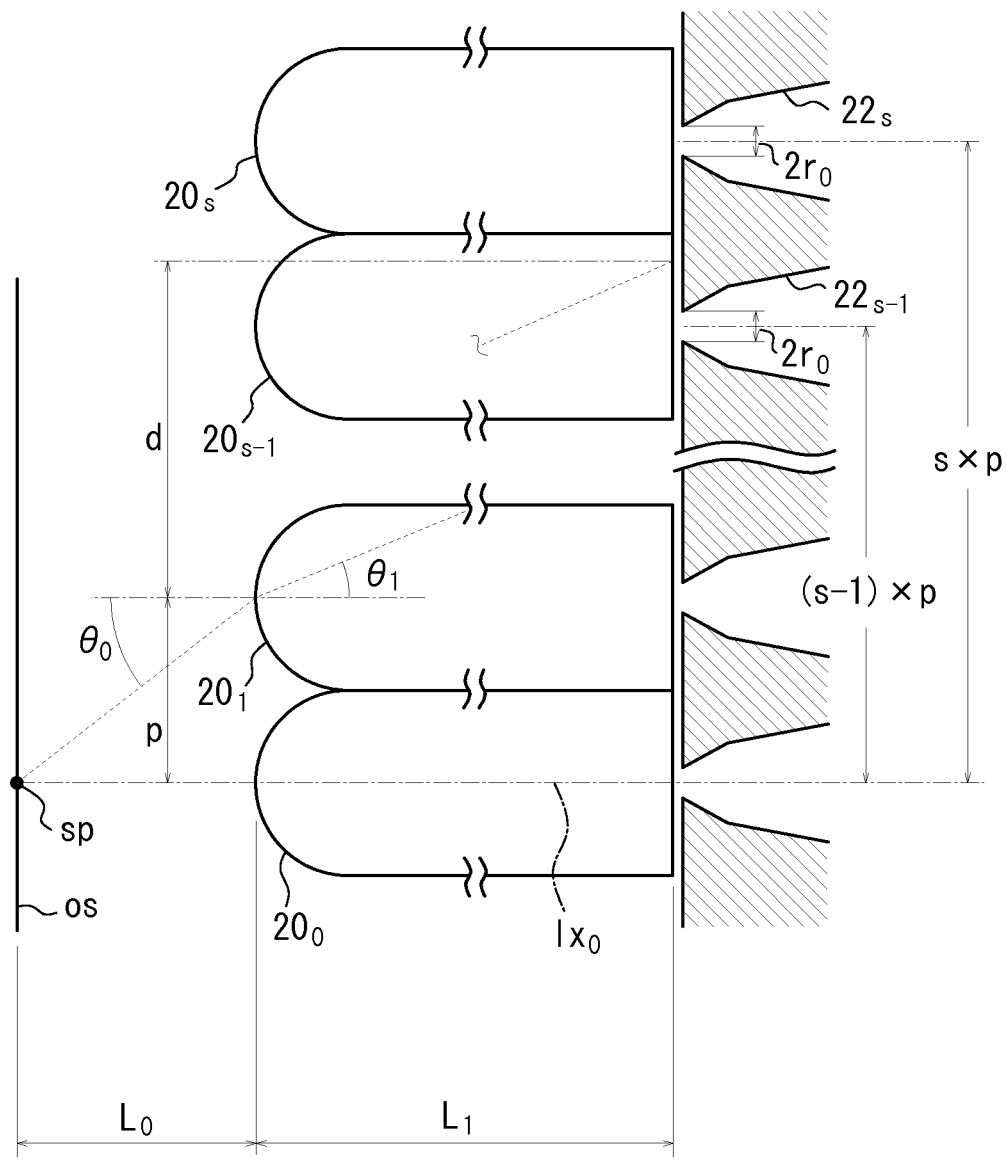
FIG. 12 illustrates the positional relationship between the first lens and a light-transmitting hole in order to illustrate calculation of the diameter at the first lens side of the light-transmitting hole in Embodiment 2.

According to the erecting equal-magnification lens array unit of Embodiment 2 with the above structure, the diameter of the light-transmitting hole 22 at the first lens 20 side is formed so that Expression (19) is satisfied, thus allowing for an even greater reduction in the amount of stray light entering into the second lens 21. The suppression of the entering stray light via Expression (19) is described below in detail with reference to FIG. 12.

Light rays proceed in all directions from any point on the object surface os and can strike the first surface of any of the first lenses 20. When a light ray striking the first surface is emitted from the second surface of a different first lens 20, the light ray becomes stray light. Therefore, the light-transmitting holes 22 are preferably formed so as to reduce such stray light in so far as possible.

A first light ray b1 is now examined. The first light ray b1 is emitted from a standard point sp on the object surface os, which is perpendicular to the optical axis of an arbitrary first lens $20_0$, and strikes the first surface of an adjacent first lens $20_1$. The angle of incidence of the first light ray b1 with respect to the first lens $20_1$ is defined as $\theta_0$, and the angle of refraction at which the first light ray b1 enters the first lens $20_1$ is defined as $\theta_1$.

By Snell's law, the relationship in Expression (20) below holds.

$$n \times \sin \theta_1 = \sin \theta_0 \quad (20)$$

The relationships in Expressions (21) and (22) below hold based on geometric relationships.

$$\tan \theta_0 = \frac{P}{L_0} \quad (21)$$

$$\tan \theta_1 = \frac{d}{L_1} \quad (22)$$

In Expression (22), d is the distance between the arrival position of the first light ray b1 on the second surface and the optical axis of the first lens $20_1$. Manipulating Expression (22) yields Expression (23).

$$d = L_1 \times \tan \theta_1 \quad (23)$$

Letting $\tan \theta_0 = \sin \theta_0$ and $\tan \theta_1 = \sin \theta_1$ and using Expressions (20) and (21) to manipulate Expression (23) yields Expression (24) below.

$$d = \frac{L_1}{L_0} \times \frac{P}{n} \quad (24)$$

Accordingly, the distance between the arrival position of the first light ray b1 on the second surface and the optical axis $1x_0$ of the first lens $20_0$ is given by Expression (25) below.

$$p + d = \left(\frac{L_1}{L_0} \frac{1}{n} + 1\right) p \quad (25)$$

If the first light ray b1 arrives between light-transmitting holes $22_{s-1}$, $22_s$ corresponding to first lenses $20_{s-1}$, $20_s$ that are (s−1) and s (s being any integer) first lenses 20 away from the first lens $20_0$, then stray light can be prevented from entering the light-transmitting holes $22_{s-1}$, $22_s$ from the first light ray b1.

The distance from the optical axis $1x_0$ to the farther edge of the light-transmitting hole $22_{s-1}$ is $r_o + (s-1) \times p$. The distance from the optical axis $1x_0$ to the closer edge of the light-transmitting hole $22_s$ is $s \times p - r_o$.

Accordingly, Expression (19) is obtained as a condition for the first light ray b1 to arrive between the light-transmitting holes $22_{s-1}$, $22_s$. In Embodiment 2, the light-transmitting holes 22 are formed so that Expression (19) is satisfied, and therefore the amount of entering stray light can be reduced as described above.

As in Embodiment 1, since the diameter of each light-transmitting hole 22 at the first lens 20 side is smaller than the diameter at the second lens 21 side, stray light from the first lens 20 of another unit optical system 23 can be prevented from striking the second lens 21.

As in Embodiment 1, treatment to suppress reflection of light or treatment to absorb light is applied to the inner surface of the light-transmitting hole 22. Therefore, propagation to the second lens 21 of stray light that passes through the aperture at the first lens 20 side and strikes the inner surface of the light-transmitting hole 22 can be prevented.

As in Embodiment 1, an erecting equal-magnification lens array unit formable using regular lenses and having an expanded depth of field for the array as a whole can be formed.

As in Embodiment 1, the first lenses 20 are arranged to be in close contact to each other along the first direction. This structure allows for the formation of an image without gaps along the first direction.

As in Embodiment 1, the unit optical systems 23 are formed so that $0.5 \leq y_0/D$. Therefore, all of the points on the object surface can be included in the area of the field of view of one of the unit optical systems 23, thus preventing a partial gap in the image. As in Embodiment 1, the unit optical systems 23 are formed so that $y_0/D \leq 1$. Therefore, by limiting the number of unit optical systems 23 that form an image for a point on the object surface to being two or less, the influence of misalignment between images can be reduced.

As in Embodiment 1, each unit optical system 23 is formed so that Expression (2) is satisfied, and therefore unevenness in the brightness can be suppressed.

As in Embodiment 1, each unit optical system 23 is formed so that Expression (3) is satisfied. As in Embodiment 1, by satisfying such a condition, the misalignment between imaging positions in images formed by adjacent unit optical systems 23 can be suppressed enough to make visual confirmation difficult.

As in Embodiment 1, the depth of field $\Delta z$ determined based on the allowable image shift amount is deeper as the degree of overlap m is closer to ½.

Next, Embodiment 3 of the present invention is described. Embodiment 3 differs from Embodiment 1 in the addition of a further limiting condition on the structure of the first lenses. Embodiment 3 is described below, focusing on the differences from Embodiment 1. Note that portions having the same function and structure as in Embodiment 1 are provided with the same reference signs. The structure and functions of the image reading unit in Embodiment 2 are the same as in Embodiment 1 (see FIGS. 1 and 2).

Next, the structure of the erecting equal-magnification lens array unit 13 in Embodiment 3 is described in detail. As in Embodiment 1, the erecting equal-magnification lens array unit 13 is configured with the first lens array 17, the second lens array 18, and the connecting portion 19 (see FIG. 3).

As in Embodiment 1, a plurality of the first lenses 20 are provided in the first lens array 17. The orientations of the first lenses 20 are determined so that the optical axes thereof are parallel to each other. Furthermore, the first lenses 20 are arranged to be in close contact to each other along a first direction perpendicular to the optical axes of the first lenses 20.

As in Embodiment 1, a plurality of the second lenses 21 (see FIG. 2) are provided in the second lens array 18. The orientations of the second lenses 21 are determined so that the optical axes thereof are parallel to each other. Furthermore, the second lenses 21 are arranged in a line along a direction perpendicular to the optical axes of the second lenses 21.

As in Embodiment 1, the first lens array 17 and the second lens array 18 are connected by the connecting portion 19. The positions of the first lens array 17 and the second lens array 18 are aligned so that the optical axis of each first lens 20 overlaps with the optical axis of one of the second lenses 21.

As in Embodiment 1, a plurality of the light-transmitting holes 22 are formed in the connecting portion 19. The light-transmitting holes 22 penetrate from each of the first lenses 20 to the second lenses 21. Note that the surface of the connecting portion 19 at the side of the first lens 20 functions as a diaphragm, blocking light entering from a surface other than the light-transmitting hole 22. Accordingly, the first lens 20, light-transmitting hole 22, and second lens 21 form a unit optical system 23.

As in Embodiment 1, the first lenses 20 and the second lenses 21 are designed and the unit optical systems 23 are structured so that each unit optical system 23 is an erecting equal-magnification optical system and is substantially telecentric on the object side. The condition for being substantially telecentric is described below.

As in Embodiment 1, a first surface of each first lens 20 and both surfaces of each second lens 21 are formed to be convex surfaces, so that the unit optical systems 23 are provided with erecting equal-magnification properties. A second surface of each first lens 20 may be convex, concave, or flat.

In particular, the first lens 20 is designed and formed so that Expression (26) below is satisfied.

$$\left| \frac{r_{11}}{L_1} - \frac{n-1}{n} \right| \leq 0.2 \qquad (26)$$

Here, $r_{11}$ is the curvature radius of the $11^{th}$ surface of the first lens 20. Furthermore, $L_1$ is the thickness of the first lens 20, and n is the refractive index of the first lens 20.

As in Embodiment 1, each unit optical system 23 is designed and formed so that Expression (3) is satisfied.

Furthermore, as in Embodiment 1, each unit optical system 23 is designed and formed so that Expression (1) is satisfied.

As in Embodiment 1, each unit optical system 23 is also designed and formed so that Expression (2) is satisfied.

As in Embodiment 1, the inner surface of each light-transmitting hole 22 is formed along the edge of two consecutive circular truncated cones having the same center line cl (see FIG. 7). The light-transmitting holes 22 are formed so that the diameter of each light-transmitting hole 22 at the first lens 20 side is smaller than the diameter at the second lens 21 side. The formation position of each light-transmitting hole 22 is determined so that the center line cl overlaps the optical axis of the first lens 20 and the second lens 21.

Furthermore, as in Embodiment 1, treatment to suppress reflection of light or treatment to absorb light is applied to the inner surface of each light-transmitting hole 22. Examples of treatment to suppress reflection of light include treatment to roughen the surface by sandblasting or the like, referred to as surface texturing, and treatment to suppress the progress of reflected light rays by forming the surface in a screw shape. Examples of treatment to absorb light include applying light-absorbing paint to the inner surface.

According to the erecting equal-magnification lens array unit of Embodiment 3 with the above structure, as in Embodiment 1, an erecting equal-magnification lens array unit formable using regular lenses and having an expanded depth of field for the array as a whole can be formed.

In the present embodiment, by forming the first lenses 20 to satisfy Expression (26), each unit optical system 23 is provided with telecentricity on the object side, as described below.

In order to make the unit optical system 23 telecentric on the object side, the back focal point of the first lens 20 and the position of the diaphragm need to be caused to coincide. The position of the back focal point of the first lens 20 is substantially equivalent to the imaging position by the first lens 20 of an object at infinity. A small diameter region of the light-transmitting hole 22 functions as the diaphragm of the unit optical system 23.

Therefore, in order for the unit optical system 23 to be telecentric on the object side, the imaging position for infinity of the first lens 20 and the position of the small diameter region of the light-transmitting hole 22 need to be caused to coincide.

The small diameter region of the light-transmitting hole 22, as described below, is preferably located on or near the second surface of the first lens 20. Accordingly, when the small diameter region of the light-transmitting hole 22 is located near the second surface of the first lens 20, it is possible to provide the unit optical system 23 with telecentricity on the object side by making the imaging position for infinity of the first lens 20 substantially coincide with the second surface of the first lens 20.

The conditions for making the imaging position for infinity coincide with the second surface of the first lens 20 are established as follows. As the geometrical-optical relationship on either side of the first surface of the first lens 20, Expression (27) holds by Abbe's invariant.

$$\frac{n}{s_1} = \frac{1}{s_0} + \frac{n-1}{r_{11}} \qquad (27)$$

In Expression (27), $s_0$ is the distance between the object and the first surface of the first lens 20. Furthermore, $s_1$ is the distance between the first surface of the first lens 20 and the imaging position of light emitted from the first surface of the first lens 20.

Since the imaging position of an object at infinity is established, setting $s_0$ to infinity allows Expression (27) to be converted to Expression (28).

$$\frac{r_{11}}{s_1} - \frac{n-1}{n} = 0 \qquad (28)$$

When Expression (28) is satisfied, the position at a distance $s_1$ from the first surface of the first lens 20 is the imaging position for infinity of the first lens 20 for which the curvature radius of the first surface is $r_{11}$. Accordingly, in order for the first lens 20 to form an image of an object at infinity on the second surface of the first lens 20, Expression (29) needs to be satisfied.

$$\frac{r_{11}}{L_1} - \frac{n-1}{n} = 0 \tag{29}$$

Even if Expression (29) is not satisfied, however, if the absolute value of the left side of Expression (29) is equal to or less than an acceptable value that can be considered substantially to be zero, then the second surface of the first lens 20 can substantially be caused to coincide with the imaging position for infinity. Note that the left side of Expression (29) not only influences adjustment of the imaging position for infinity, but also the magnification of the first lens 20. Therefore, the acceptable value is established taking into consideration adjustment of the imaging position for infinity and the magnification of the first lens 20.

As the absolute value of the left side of Expression (29) increases, the imaging position for infinity is spaced farther away from the second surface of the first lens 20. As the imaging position for infinity is spaced farther away, the telecentricity of the first lens 20 on the object side is reduced. If the acceptable value is 0.3, the telecentricity of the first lens 20 on the object side is maintained.

As the absolute value of the left side of Expression (29) increases, the magnification of the first lens 20 increases. In the present embodiment, the first lens 20 is preferably an optical reduction system, i.e. the magnification is preferably less than one. The reason is that the first lens 20 and the second lens 21 are used to configure the unit optical system 23 so as to have erecting equal-magnification properties.

The need for the magnification of the first lens 20 to be less than one is now described in further detail. Since the magnification of the unit optical system 23 is one, the product of the magnification of the first lens 20 and the second lens 21 that configure the unit optical system 23 is one. Accordingly, one of the first lens 20 and the second lens 21 needs to be an optical reduction system, and the other an optical expansion system. As described above, the first lenses 20 are arranged to be in close contact to each other along the first direction (see FIG. 3). Accordingly, in order for the first lenses 20 to be in close contact to each other, it is an essential requirement that the first lenses 20 be optical reduction systems.

When the absolute value of the left side of Expression (29) is less than 0.2, the magnification of the first lens 20 is less than one. Therefore, the acceptable value that takes into consideration the magnification of the first lens 20 is calculated as 0.2.

Accordingly, taking into consideration both the usefulness of the imaging position for infinity and the magnification of the first lens 20, the acceptable value used for the absolute value of the left side of Expression (29) is preferably 0.2. Setting the acceptable value to 0.2 yields Expression (26).

Next, the reason why the small diameter region of the light-transmitting hole 22 is preferably located on or near the second surface of the first lens 20 is described.

Between the first lens 20 and the second lens 21, it is necessary to provide a light shielding wall to prevent stray light from one unit optical system 23 to another unit optical system 23, as well as a diaphragm for adjusting brightness. In the present embodiment, the inner wall of the light-transmitting hole 22 formed in the connecting portion 19 can function as a light shielding wall. Accordingly, the diaphragm is placed either between the first lens 20 and the connecting portion 19 or between the connecting portion 19 and the second lens 21.

However, dust may attach to the second surface of the first lens 20 and the first surface of the second lens 21. If dust attaches, the amount of light of the subject image reaching the image sensor 14 is reduced. In order to reduce the influence of dust in so far as possible, the light beams that pass through the second surface of the first lens 20 and the first surface of the second lens 21, to which dust can attach, are preferably made as large as possible.

In order to satisfy such conditions, the imaging position of the optical image of a subject at a finite distance needs to be spaced sufficiently from the second surface of the first lens 20 and the first surface of the second lens 21. In order to sufficiently space the imaging position of the optical image of the subject at a finite distance from both surfaces, the optical image of the subject at a finite distance is preferably formed within the light-transmitting hole 22. Furthermore, in order to form the optical image of the subject at a finite distance within the light-transmitting hole 22, a subject at infinity needs to be imaged at any position on the first lens 20 side of the imaging position of the subject at a finite distance.

As described above, in order to provide telecentricity on the object side, the diaphragm needs to be positioned at the focal point of the first lens 20. Therefore, the diaphragm needs to be positioned on the first lens 20 side within the light-transmitting hole 22. Accordingly, the diaphragm needs to be provided between the first lens 20 and the connecting portion 19.

In order to prevent stray light from one unit optical system 23 to another unit optical system 23, the light beam striking the second surface of the first lens 20 and the first surface of the second lens 21 needs to be narrower than the diameter of the first and second lenses 20 and 21. In order to make the light beam narrower at the second surface of the first lens 20 and the first surface of the second lens 21, the distance between the second surface of the first lens 20 and the first surface of the second lens 21 needs to be shortened.

As the light shielding wall lengthens along the optical axis direction, the effect of preventing stray light increases. Accordingly, in order to maximize the effect by the light shielding wall of preventing stray light over the short distance between the second surface of the first lens 20 and the first surface of the second lens 21, it is desirable that all of the light paths between the first lens 20 and the second lens 21 be covered by the light-transmitting hole 22. In other words, one end of the light-transmitting hole 22 is preferably caused to coincide with the second surface of the first lens 20, and the other end is preferably caused to coincide with the first surface of the second lens 21. That is, preferably no void is provided between the light-transmitting hole 22 and each of the first lens 20 and the second lens 21.

Since no void is provided between the second surface of the first lens 20 and the light-transmitting hole 22, the diaphragm needs to be in close contact with the end of the light-transmitting hole 22 at the first lens 20 side. Instead of providing the diaphragm in close contact with the end of the light-transmitting hole 22, a small diameter region may be formed at the end of the light-transmitting hole 22 and caused to function as the diaphragm. Therefore, the small diameter region of the light-transmitting hole 22 is preferably located on or near the second surface of the first lens 20.

As in Embodiment 1, each unit optical system 23 is formed so that Expression (3) is satisfied. In other words, the unit optical system 23 is designed so that the angle calculated by the allowable image shift amount δ and the allowable depth of field Δz becomes the maximum angle for $\theta_g$.

This condition is the condition that the unit optical system 23 be substantially telecentric on the object side. Based on paraxial theory, Expression (26) is a condition calculated for telecentricity on the object side. Therefore, telecentricity may be reduced due to factors other than the curvature radius of the first surface of the first lens 20 in the unit optical system 23. By satisfying a condition such as Expression (3) for the entire unit optical system 23, the misalignment between imaging positions in images formed by adjacent unit optical systems 23 can thus be suppressed enough to make visual confirmation difficult.

As in Embodiment 1, the unit optical systems 23 are formed so that $0.5 \leq y_0/D$. Therefore, all of the points on the object surface os can be included in the area of the field of view of one of the unit optical systems 23, thus preventing a partial gap in the image. As in Embodiment 1, the unit optical systems 23 are formed so that $y_0/D \leq 1$. Therefore, by limiting the number of unit optical systems 23 that form an image for a point on the object surface os to being two or less, the influence of misalignment between images can be reduced.

As in Embodiment 1, each unit optical system 23 is formed so that Expression (2) is satisfied, and therefore unevenness in the brightness can be suppressed.

As in Embodiment 1, the first lenses 20 are arranged to be in close contact to each other along the first direction. This structure allows for the formation of an image without gaps along the first direction.

As in Embodiment 1, since the diameter of each light-transmitting hole 22 at the first lens 20 side is smaller than the diameter at the second lens 21 side, stray light from the first lens 20 of another unit optical system 23 can be prevented from striking the second lens 21.

As in Embodiment 1, treatment to suppress reflection of light or treatment to absorb light is applied to the inner surface of the light-transmitting hole 22. Therefore, propagation to the second lens 21 of stray light that passes through the aperture at the first lens 20 side and strikes the inner surface of the light-transmitting hole 22 can be prevented.

As in Embodiment 1, the depth of field $\Delta z$ determined based on the allowable image shift amount is deeper as the degree of overlap m is closer to $\frac{1}{2}$.

Next, Embodiment 4 of the present invention is described. Embodiment 4 differs from Embodiment 1 in the addition of a further limiting condition on the structure of the unit optical system. Embodiment 4 is described below, focusing on the differences from Embodiment 1. Note that portions having the same function and structure as in Embodiment 1 are provided with the same reference signs. The structure and functions of the image reading unit in Embodiment 4 are the same as in Embodiment 1 (see FIGS. 1 and 2).

Next, the structure of the erecting equal-magnification lens array unit 13 in Embodiment 4 is described in detail. As in Embodiment 1, the erecting equal-magnification lens array unit 13 is configured with the first lens array 17, the second lens array 18, and the connecting portion 19 (see FIG. 3).

As in Embodiment 1, a plurality of the first lenses 20 are provided in the first lens array 17. The orientations of the first lenses 20 are determined so that the optical axes thereof are parallel to each other. Furthermore, the first lenses 20 are arranged to be in close contact to each other along a first direction perpendicular to the optical axes of the first lenses 20.

As in Embodiment 1, a plurality of the second lenses 21 (see FIG. 2) are provided in the second lens array 18. The orientations of the second lenses 21 are determined so that the optical axes thereof are parallel to each other. Furthermore, the second lenses 21 are arranged in a line along a direction perpendicular to the optical axes of the second lenses 21.

As in Embodiment 1, the first lens array 17 and the second lens array 18 are connected by the connecting portion 19. The positions of the first lens array 17 and the second lens array 18 are aligned so that the optical axis of each first lens 20 overlaps with the optical axis of one of the second lenses 21.

As in Embodiment 1, a plurality of the light-transmitting holes 22 are formed in the connecting portion 19. The light-transmitting holes 22 penetrate from each of the first lenses 20 to the second lenses 21. Note that the surface of the connecting portion 19 at the side of the first lens 20 functions as a diaphragm, blocking light entering from a surface other than the light-transmitting hole 22. Accordingly, the first lens 20, light-transmitting hole 22, and second lens 21 form a unit optical system 23.

As in Embodiment 1, the first lenses 20 and the second lenses 21 are designed and the unit optical systems 23 are structured so that each unit optical system 23 is an erecting equal-magnification optical system and is substantially telecentric on the object side. The condition for being substantially telecentric is described below.

As in Embodiment 1, a first surface of each first lens 20 and both surfaces of each second lens 21 are formed to be convex surfaces, so that the unit optical systems 23 are provided with erecting equal-magnification properties. A second surface of each first lens 20 may be convex, concave, or flat.

As in Embodiment 1, each unit optical system 23 is designed and formed so that Expression (1) is satisfied.

As in Embodiment 1, each unit optical system 23 is also designed and formed so that Expression (2) is satisfied.

As in Embodiment 1, in order to be substantially telecentric, each unit optical system 23 is also designed and formed so that Expression (3) is satisfied.

Furthermore, each unit optical system 23 is designed and formed so that Expressions (30) and (31) below are satisfied.

$$\frac{n \times L_{12}}{L_1} < 1 \tag{30}$$

$$(n-1)\frac{L_{12}}{r_{11}} < 1 \tag{31}$$

Here, $r_{11}$ is the curvature radius of the first surface of the first lens 20. $L_1$ is the thickness of the first lens 20. $L_{12}$ is the interval between the first lens 20 and the second lens 21. Furthermore, n is the refractive index of the first lens 20.

Furthermore, each unit optical system 23 is designed and formed so that Expression (32) below is satisfied.

$$0.03 < \frac{r_{11}}{L_{total}} \tag{32}$$

$L_{total}$ is the distance between object images.

As in Embodiment 1, the inner surface of each light-transmitting hole 22 is formed along the edge of two consecutive circular truncated cones having the same center line cl (see FIG. 7). The light-transmitting holes 22 are formed so that the diameter of each light-transmitting hole 22 at the first lens 20 side is smaller than the diameter at the second lens 21 side. The formation position of each light-transmitting hole 22 is determined so that the center line cl overlaps the optical axis of the first lens 20 and the second lens 21.

Furthermore, as in Embodiment 1, treatment to suppress reflection of light or treatment to absorb light is applied to the inner surface of each light-transmitting hole 22. Examples of treatment to suppress reflection of light include treatment to roughen the surface by sandblasting or the like, referred to as surface texturing, and treatment to suppress the progress of reflected light rays by forming the surface in a screw shape. Examples of treatment to absorb light include applying light-absorbing paint to the inner surface.

According to the erecting equal-magnification lens array unit of Embodiment 4 with the above structure, as in Embodiment 1, an erecting equal-magnification lens array unit formable using regular lenses and having an expanded depth of field for the array as a whole can be formed.

As in Embodiment 1, each unit optical system 23 is formed so that Expression (3) is satisfied. In other words, the unit optical system 23 is designed so that the angle calculated by the allowable image shift amount δ and the allowable depth of field Δz becomes the maximum angle for $\theta_g$.

As in Embodiment 1, the first lenses 20 are arranged to be in close contact to each other along the first direction. This structure allows for the formation of an image without gaps along the first direction.

In Embodiment 4, the unit optical systems 23 are formed so that Expressions (30) and (31) are satisfied, thus making it possible to prevent gaps in the optical image during transmission from the first lens array 17 to the second lens array 18.

Figure 13:
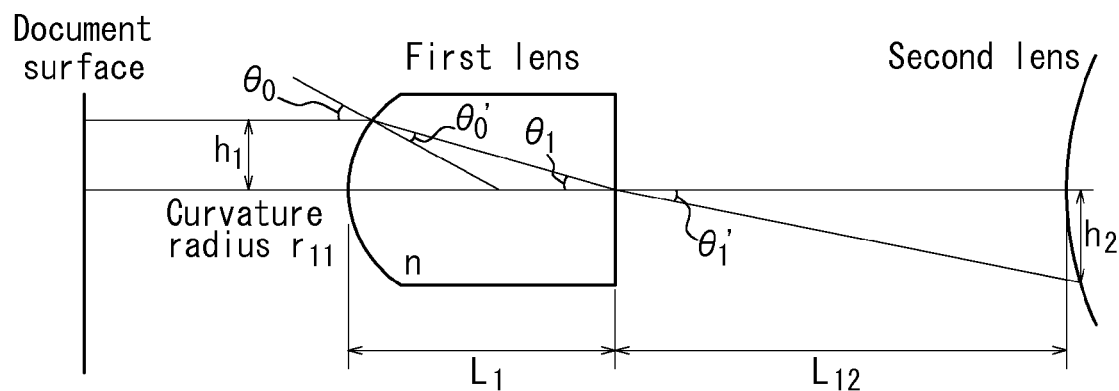
FIG. 13 illustrates the relationship between the angle and position of incidence for a light ray that passes through the first lens and strikes a first surface of the second lens in Embodiment 4.
Figure 15:
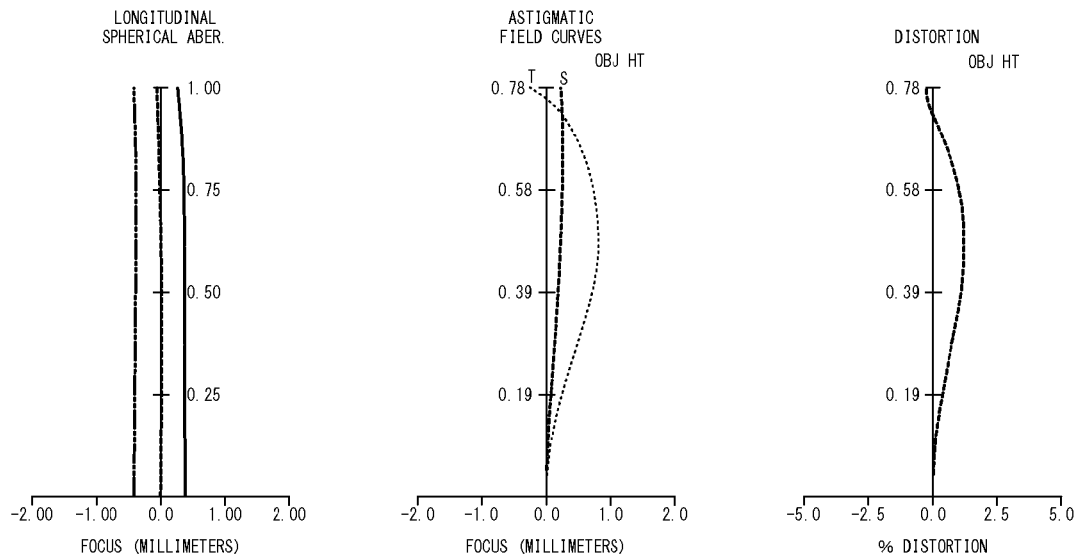
FIG. 15 is an aberration diagram illustrating spherical aberration, astigmatic aberration, and distortion aberration of the first lens when the second surface of the first lens has a curvature radius of 10 mm in Embodiment 4.
Figure 16:
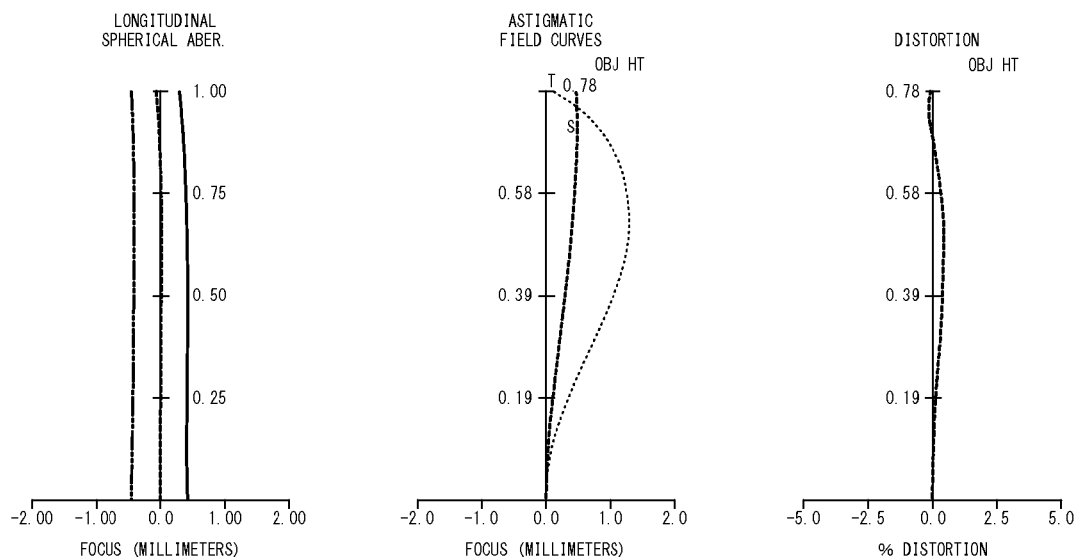
FIG. 16 is an aberration diagram illustrating spherical aberration, astigmatic aberration, and distortion aberration of the first lens when the second surface of the first lens has a curvature radius of 5 mm in Embodiment 4.
Figure 17:
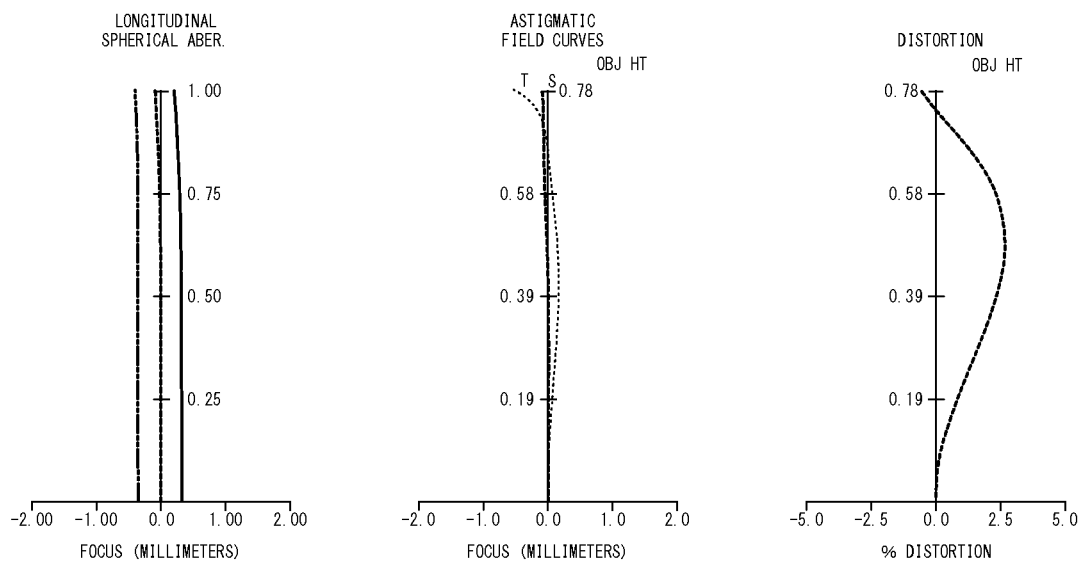
FIG. 17 is an aberration diagram illustrating spherical aberration, astigmatic aberration, and distortion aberration of the first lens when the second surface of the first lens has a curvature radius of −10 mm in Embodiment 4.
Figure 18:
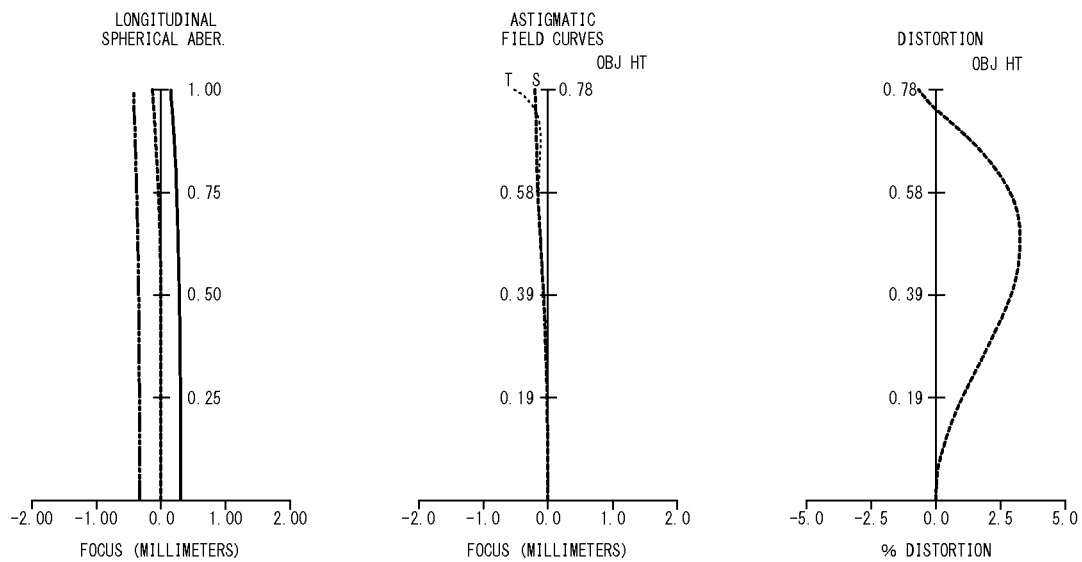
FIG. 18 is an aberration diagram illustrating spherical aberration, astigmatic aberration, and distortion aberration of the first lens when the second surface of the first lens has a curvature radius of −5 mm in Embodiment 4.

As described above, in the first lens array 17, a plurality of the first lenses 20 are arranged to be in close contact to each other along the first direction. With such a structure, a gap may occur in the optical image during transmission of the optical image from the first lens array 17 to the second lens array 18. In FIG. 13, as compared to an interval $h_1$ between the optical axis and the position of incidence from the object on the first surface of the first lens 20, when an interval $h_2$ between the optical axis and the position of incidence of a light ray from the first lens 20 on the first surface of the second lens 21 is longer, then the light ray cannot enter the second lens 21, and a gap occurs. Accordingly, by satisfying the expression $h_2/h_1<1$, gaps in the image during transmission of light rays between the first lens 20 and the second lens 21 can be prevented.

Assume that the light ray from any point on the object forms an angle of $\theta_0$ with respect to the optical axis and strikes the first surface of the first lens 20 at a distance of $h_1$ from the optical axis. The relationships in Expressions (33) to (38) below are satisfied based on geometric relationships, where the angle of refraction at the first surface of the light striking the first surface is $\theta_0'$, the angle with respect to the optical axis of the light striking the first surface is $\theta_1$, and the angle of emergence from the second surface of the light striking the first surface is $\theta_1'$.

$$\sin\theta_0 = n \times \sin\theta_0' \tag{33}$$

$$n \times \sin\theta_1 = \sin\theta_1' \tag{34}$$

$$\theta_0' + \theta_1 = \theta_0 \tag{35}$$

$$\sin\theta_0 = \frac{h_1}{r_{11}} \tag{36}$$

$$\tan\theta_1 = \frac{h_1}{L_1} \tag{37}$$

$$\tan\theta_1' = \frac{h_2}{L_{12}} \tag{38}$$

Since the unit optical system 23 is telecentric on the object side, the entrance direction of the light rays that should be transmitted to the second lens 21 is substantially parallel to the optical axis, making $\theta_0$, $\theta_1$, and $\theta_1'$ minute angles. Therefore, approximating as in Expressions (39) to (44) and using Expressions (33) to (38) yields Expressions (45) and (46).

$$\sin\theta_0 = \theta_0 \tag{39}$$

$$\sin\theta_0' = \theta_0' \tag{40}$$

$$\sin\theta_1 = \theta_1 \tag{41}$$

$$\sin\theta_1' = \theta_1' \tag{42}$$

$$\tan\theta_1 = \theta_1 \tag{43}$$

$$\tan\theta_1' = \theta_1' \tag{44}$$

$$\frac{h_2}{h_1} = \frac{n \times L_{12}}{L_1} \tag{45}$$

$$\frac{h_2}{h_1} = \frac{(n-1) \times L_{12}}{r_{11}} \tag{46}$$

Therefore, if the left side of Expressions (45) and (46) is less than one, it is possible to prevent gaps in the image during transmission of light rays from the first lens 20 to the second lens 21, yielding Expressions (30) and (31).

In the present embodiment, each unit optical system 23 is formed so that Expression (32) is satisfied, and therefore as explained below, color mixing can be prevented.

In an image reading device or image forming device for which use of the erecting equal-magnification lens array unit 13 is envisioned, there is demand for formation of a 600 dpi image at the image surface is. At 600 dpi, one dot is 0.0423 mm. Accordingly, if the chromatic aberration of magnification is 0.04 mm or less, the occurrence of color mixing is prevented.

The chromatic aberration of magnification can be varied by the magnifications of the first lens 20 and the second lens 21. Since the unit optical system 23 is an erecting equal-magnification optical system, however, setting the magnification of one lens determines the magnification of the other lens. Accordingly, it suffices to take into consideration only the chromatic aberration of magnification based on the magnification of one of the lenses.

In this case, the chromatic aberration of magnification of the first lens 20 is considered. As the variable that influences the chromatic aberration of magnification of the first lens 20, $r_{11}/L_{total}$ may be cited. With regard to the first lens 20, the curvature radius of the first surface greatly influences the chromatic aberration of magnification, whereas variation in the curvature radius of the second surface exerts a relatively small influence on the aberration. For example, in FIG. 14 to FIG. 18, the aberration diagrams depict similar curves for spherical aberration, astigmatic aberration, and distortion aberration regardless of whether the second surface of the first lens 20 is planar, convex, or concave. Therefore, the chromatic aberration of magnification is considered only for $r_{11}/L_{total}$ using the curvature radius of the first surface.

If $r_{11}/L_{total}$ falls below 0.03, the chromatic aberration of magnification becomes 0.04. Therefore, if $r_{11}/L_{total}$ exceeds 0.03, the chromatic aberration of magnification becomes less than 0.04, and color mixing can be prevented.

As in Embodiment 1, the unit optical systems 23 are formed so that $0.5 \leq y_0/D$. Therefore, all of the points on the object surface os can be included in the area of the field of view of one of the unit optical systems 23, thus preventing a partial gap in the image. As in Embodiment 1, the unit optical systems 23 are formed so that $y_0/D \leq 1$. Therefore, by limiting the number of unit optical systems 23 that form an image for a point on the object surface os to being two or less, the influence of misalignment between images can be reduced.

As in Embodiment 1, each unit optical system 23 is formed so that Expression (2) is satisfied, and therefore unevenness in the brightness can be suppressed.

As in Embodiment 1, since the diameter of each light-transmitting hole 22 at the first lens 20 side is smaller than the diameter at the second lens 21 side, stray light from the first lens 20 of another unit optical system 23 can be prevented from striking the second lens 21.

As in Embodiment 1, treatment to suppress reflection of light or treatment to absorb light is applied to the inner surface of the light-transmitting hole 22. Therefore, propagation to the second lens 21 of stray light that passes through the aperture at the first lens 20 side and strikes the inner surface of the light-transmitting hole 22 can be prevented.

As in Embodiment 1, the depth of field $\Delta z$ determined based on the allowable image shift amount is deeper as the degree of overlap m is closer to $\frac{1}{2}$.

EXAMPLES

Next, the effects of the present invention are described via examples, yet these examples are provided merely to illustrate the effects of the present invention and in no way limit the present invention.

Using the lens data in Table 1 and Table 2, the unit optical system 23 of Example 1 was produced. The surfaces corresponding to the surface numbers in Table 1 are shown in FIG. 2.

TABLE 1

| Surface number | Curvature radius | Interval | Aperture radius | Glass material |
|---|---|---|---|---|
| object | ∞ | 1.50 | | |
| 1 | ∞ | 1.00 | | *2 |
| 2 | ∞ | 8.70 | | |
| 3 *1 | 1.7000 | 5.00 | 0.740 | *3 |
| 4 | ∞ | 0.05 | | |
| 5 | ∞ | 1.85 | 0.125 | |
| 6 | ∞ | 0.10 | 0.420 | |
| 7 *1 | 0.6906 | 7.80 | | *3 |
| 8 *1 | −1.8428 | 0.10 | | |
| 9 | ∞ | 6.90 | 0.550 | |
| image | ∞ | 0.00 | | |

Note the following in Table 1.
*1: indicates an aspheric surface, with the aspheric surface equation being given by Expression (47) below
*2: SCHOTT AG bk7
*3: ZEONEX (registered trademark) E48R by Zeon Corporation
*4: diaphragm $$z = \frac{\frac{h^2}{r}}{1 + \sqrt{1 - (1+k)\left(\frac{h^2}{r}\right)}} + Ah^4 + Bh^6 + Ch^8 + DH^{10} \quad (47)$$

In Expression (47),
z is the depth from the tangent plane with respect to the surface apex,
r is the curvature radius,
h is the height from the optical axis,
k is the conic constant,
A is a fourth-order aspheric surface coefficient,
B is a sixth-order aspheric surface coefficient,
C is an eighth-order aspheric surface coefficient, and
D is a tenth-order aspheric surface coefficient.

Table 2 lists the conic constant k and the aspheric surface coefficients A, B, C, and C.

TABLE 2

| | 3$^{rd}$ surface | 7$^{th}$ surface | 8$^{th}$ surface |
|---|---|---|---|
| k | 0.0000 | 0.0000 | 0.0000 |
| A | −0.0301 | −0.1691 | −0.0156 |
| B | 0.0028 | 1.6691 | 0.0000 |
| C | 0.0000 | 0.0000 | 0.0000 |
| D | 0.0000 | 0.0000 | 0.0000 |

Using the lens data in Table 3 and Table 4, the unit optical system 23 of Example 2 was produced. The surfaces corresponding to the surface numbers in Table 3 are the same as in Table 1.

TABLE 3

| Surface number | Curvature radius | Interval | Aperture radius | Glass material |
|---|---|---|---|---|
| object | ∞ | 1.50 | | |
| 1 | ∞ | 1.00 | | *2 |
| 2 | ∞ | 8.70 | | |
| 3 *1 | 1.7190 | 5.00 | 0.74 | *3 |
| 4 | −5 | 0.00 | 0.23 | |
| 5 | ∞ | 2.00 | | |
| 6 | ∞ | 0.00 | | |
| 7 *1 | 0.7077 | 7.60 | | *3 |
| 8 *1 | −1.9230 | 7.20 | 0.55 | |
| 9 | ∞ | 0.00 | | |
| image | ∞ | 0.00 | | |

Note the following in Table 3.
*1: indicates an aspheric surface, with the aspheric surface equation being given by Expression (47) above. Table 4 lists the conic constant k and the aspheric surface coefficients A, B, C, and C.
*2: SCHOTT AG bk7
*3: ZEONEX (registered trademark) E48R by Zeon Corporation
*4: diaphragm

TABLE 4

| | 3$^{rd}$ surface | 7$^{th}$ surface | 8$^{th}$ surface |
|---|---|---|---|
| k | −5.8980E+00 | 0.0000E+00 | 0.0000E+00 |
| A | 8.9807E−02 | −1.7518E−01 | −8.0168E−03 |
| B | −1.0321E−02 | −1.3069E+00 | −7.4546E−02 |
| C | −5.0856E−02 | −9.0040E−03 | 1.9904E−01 |
| D | 5.7257E−02 | −9.4372E−03 | 1.9395E−01 |

Using the lens data in Table 5 and Table 6, the unit optical system 23 of Example 3 was produced. The surfaces corresponding to the surface numbers in Table 5 are the same as in Table 1.

TABLE 5

| Surface number | Curvature radius | Interval | Aperture radius | Glass material |
|---|---|---|---|---|
| object | ∞ | 1.500 | | |
| 1 | ∞ | 1.000 | | *2 |
| 2 | ∞ | 8.700 | | |
| 3 *1 | 1.6784 | 5.000 | 0.74 | *3 |
| 4 | 8.4694 | 0.000 | 0.13 | |
| 5 *4 | ∞ | 2.000 | | |
| 6 | ∞ | 0.000 | | |
| 7 *1 | 0.7208 | 7.833 | 0.60 | *3 |

TABLE 5-continued

| Surface number | Curvature radius | Interval | Aperture radius | Glass material |
|---|---|---|---|---|
| 8 *1 | −1.8221 | 0.000 | | |
| 9 | ∞ | 6.967 | 0.52 | |
| image | ∞ | 0.000 | | |

Note the following in Table 5.

*1: indicates an aspheric surface, with the aspheric surface equation being given by Expression (47) above. Table 6 lists the conic constant k and 5 the aspheric surface coefficients A, B, C, and C.
*2: SCHOTT AG bk7
*3: ZEONEX (registered trademark) E48R by Zeon Corporation
*4: diaphragm

TABLE 6

| | $3^{rd}$ surface | $7^{th}$ surface | $8^{th}$ surface |
|---|---|---|---|
| k | 0 | 0 | 0 |
| A | −2.9486E−02 | −2.8371E−01 | −1.3049E−02 |
| B | 5.7341E−03 | −1.1100E+00 | −2.7852E−02 |
| C | 0.0000E+00 | 0.0000E+00 | 1.2304E−01 |
| D | 0.0000E+00 | 0.0000E+00 | −1.2112E−01 |

Using the lens data in Table 7 and Table 8, the unit optical system 23 of Example 4 was designed. The surfaces corresponding to the surface numbers in Table 7 are the same as in Table 1.

TABLE 7

| Surface number | Curvature radius | Interval | Aperture radius | Glass material |
|---|---|---|---|---|
| object | ∞ | 1.500 | | |
| 1 | ∞ | 1.000 | | *2 |
| 2 | ∞ | 9.000 | | |
| 3 *1 | 2.660 | 12.000 | 0.74 | *3 |
| 4 *1 | −5.540 | 0.000 | 0.50 | |
| 5 *4 | ∞ | 2.100 | | |
| 6 | ∞ | 0.000 | | |
| 7 *1 | 0.828 | 4.585 | | *3 |
| 8 *1 | −1.022 | 0.000 | | |
| 9 | ∞ | 2.815 | 0.49 | |
| image | ∞ | 0.000 | | |

Note the following in Table 7.

*1: indicates an aspheric surface, with the aspheric surface equation being given by Expression (47) above. Table 6 lists the conic constant k and the aspheric surface coefficients A, B, C, and C.
*2: SCHOTT AG bk7
*3: ZEONEX (registered trademark) E48R by Zeon Corporation
*4: diaphragm

TABLE 8

| | $3^{rd}$ surface | $4^{th}$ surface | $7^{th}$ surface | $8^{th}$ surface |
|---|---|---|---|---|
| k | −1.6009E−01 | 0.0000E+00 | 0.0000E+00 | 0.0000E+00 |
| A | −8.1010E−03 | −6.9221E−01 | −4.7449E−02 | 3.9365E−01 |
| B | 2.0616E−03 | 9.5984E−01 | −3.0200E−01 | −3.7270E−01 |
| C | −2.1424E−04 | −1.8301E−02 | −3.3811E−02 | 1.5002E−02 |
| D | −1.0351E−03 | −1.3022E−02 | −1.7414E−02 | 3.7274E−03 |

Using the lens data in Table 9 and Table 10, the unit optical system 23 of Example 5 was designed. The surfaces corresponding to the surface numbers in Table 9 are the same as in Table 1.

TABLE 9

| Surface number | Curvature radius | Interval | Aperture radius | Glass material |
|---|---|---|---|---|
| object | ∞ | 1.500 | | |
| 1 | ∞ | 1.000 | | *2 |
| 2 | ∞ | 8.700 | | |
| 3 *1 | 1.4072 | 4.200 | 0.74 | *3 |
| 4 | ∞ | 0.000 | | |
| 5 *4 | ∞ | 2.200 | 0.19 | |
| 6 | ∞ | 0.000 | | |
| 7 *1 | 0.8312 | 9.544 | | *3 |
| 8 *1 | −2.5697 | 0.000 | | |
| 9 | ∞ | 5.860 | 0.48 | |
| image | ∞ | 0.000 | | |

Note the following in Table 9.

*1: indicates an aspheric surface, with the aspheric surface equation being given by Expression (47) above. Table 6 lists the conic constant k and the aspheric surface coefficients A, B, C, and C.
*2: SCHOTT AG bk7
*3: ZEONEX (registered trademark) E48R by Zeon Corporation
*4: diaphragm

TABLE 10

| | $3^{rd}$ surface | $7^{th}$ surface | $8^{th}$ surface |
|---|---|---|---|
| k | −4.1282E+00 | 0.0000E+00 | 0.0000E+00 |
| A | 1.1274E−01 | −2.4804E−01 | −2.0559E−02 |
| B | −6.7623E−02 | −9.6150E−02 | −8.2142E−02 |
| C | 9.7066E−02 | −3.5369E−01 | 2.6882E−01 |
| D | −7.0296E−02 | −2.9529E−01 | 1.3010E−01 |

As indicated by the fourth surface in Tables 1, 3, 5, 7, and 9, it is clear that erecting equal-magnification properties can be provided whether the second surface of the first lens 20 is planar (see Examples 1 and 5), concave (see Examples 2 and 4), or convex (see Example 3).

The field of view radius $y_0$ of the unit optical system 23 and the diameter D of the unit optical system 23 in Examples 1 to 5 was measured, and the ratio of the field of view radius $y_0$ to the diameter D was calculated. Table 11 lists the calculation results.

TABLE 11

| | Example 1 | Example 2 | Example 3 | Example 4 | Example 5 |
|---|---|---|---|---|---|
| Field of view radius $y_0$ | 0.78 | 1.10 | 0.93 | 0.92 | 1.02 |
| Sensor diameter D | 1.50 | 1.50 | 1.50 | 1.50 | 1.50 |
| $y_0/D$ | 0.52 | 0.73 | 0.62 | 0.61 | 0.68 |

As shown in Table 11, the unit optical system 23 can be formed so that $0.5 \leq y_0/D \leq 1.0$.

Based on the field of view radius $y_0$ of the unit optical system 23 and the diameter D of the unit optical system 23 in Examples 1 to 5, the depth of field $\Delta z$ was calculated. Note that the allowable image shift amount δ was set to 0.05 mm. Table 12 lists the calculation results.

TABLE 12

| | Example 1 | Example 2 | Example 3 | Example 4 | Example 5 |
|---|---|---|---|---|---|
| $\theta_g$ [deg] | 1.1000 | 1.6500 | 1.1000 | 1.3500 | 1.4400 |
| $\tan\theta_g$ | 0.0192 | 0.0288 | 0.0192 | 0.0236 | 0.0251 |
| $\Delta z$ | 2.6000 | 1.7400 | 2.6000 | 2.1200 | 1.9900 |

Whereas the depth of field is ±0.4 when using a conventional Selfoc lens (registered trademark) or a rod lens, the depth of field was expanded, as shown by Table 12, to ±2.6 in Example 1, ±1.74 in Example 2, ±2.60 in Example 3, ±2.12 in Example 4, and ±1.99 in Example 5.

For the unit optical system 23 in Example 1 through Example 3, it was calculated whether a light-transmitting hole 22 satisfying Expression (19) could be designed. Table 13 lists the calculation results.

TABLE 13

|  | Example 1 | Example 2 | Example 3 |
|---|---|---|---|
| $r_o$ | 0.125 | 0.23 | 0.13 |
| $\left(\frac{L_1}{L_0}\frac{1}{n}+1\right)P$ | 1.94 | 1.94 | 1.94 |
| Left side of Expression (19) | 1.625 when s = 2 | 1.73 when s = 2 | 1.63 when s = 2 |
| Right side of Expression (19) | 2.875 when s = 2 | 2.77 when s = 2 | 2.87 when s = 2 |

As shown in Table 13, when the radius $r_o$ of the light-transmitting hole 22 at the first lens 20 side is 0.125 in Example 1, 0.23 in Example 2, and 0.13 in Example 3, an integer s satisfying Expression (19) can be found. By thus having the unit optical system 23 in Example 1 through Example 3 satisfy Expression (19), it is clear that a light-transmitting hole 22 that reduces the amount of stray light can be designed.

For the unit optical system 23 in Example 1 through Example 3, it was calculated whether a first lens 20 satisfying Expression (26) could be designed. Table 14 lists the calculation results.

TABLE 14

|  | Example 1 | Example 2 | Example 3 |
|---|---|---|---|
| $\left\|\frac{r_{11}}{L_1} - \frac{n-1}{n}\right\|$ | 0.006 | 0.003 | 0.110 |

As shown in Table 14, in each of Example 1 through Example 3, the left side of Expression (26) is less than 0.2. It is thus clear that a first lens 20 satisfying Expression (26) in the unit optical system 23 in Example 1 through Example 3 can be designed.

Figure 19:
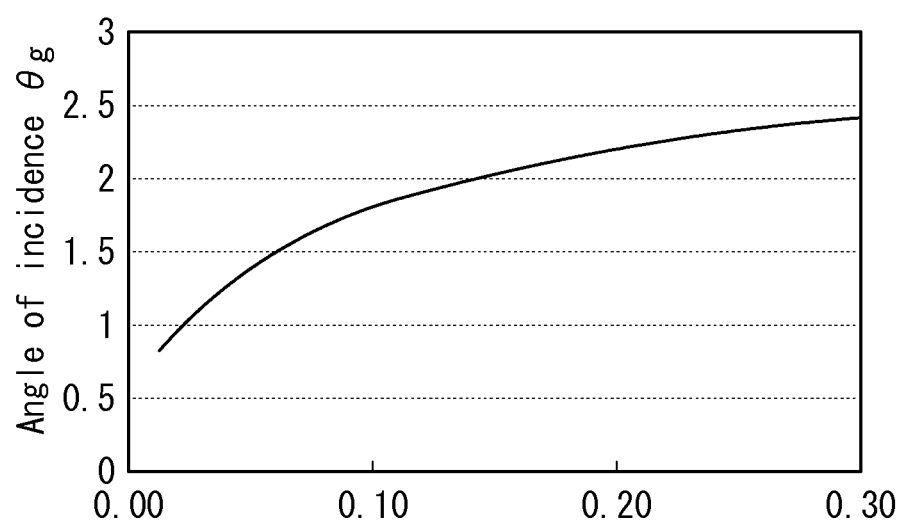
FIG. 19 is a graph illustrating the relationship between the left side of Expression (26) and the angle of incidence.

A first lens 20 for which the left side of Expression (1) was 0 to 0.2 was designed by fixing the thickness $L_0$ of the first lens 20 and varying the curvature radius $r_{11}$ of the first surface. In the designed lens, the influence on telecentricity of the misalignment from the diaphragm of the imaging position for infinity was examined. The angle of incidence $\theta_g$ into the unit optical system 23 of a light ray that passes through the center of gravity cg of the fine optical image fi illustrated in FIG. 5 was used as the index for telecentricity. As the angle of incidence $\theta_g$ increases, the telecentricity reduces. FIG. 19 illustrates the relationship between the left side of Expression (26) and the angle of incidence $\theta_g$.

As illustrated in FIG. 19, as the left side of Expression (26) increases, the angle of incidence $\theta_g$ increases. In order to obtain the telecentricity required for the erecting equal-magnification lens array unit 13, the angle of incidence $\theta_g$ is preferably less than 2.5°. In FIG. 19, if the left side of Expression (26) is less than 0.3, it is clear that the angle of incidence $\theta_g$ is less than 2.5.

Figure 20:
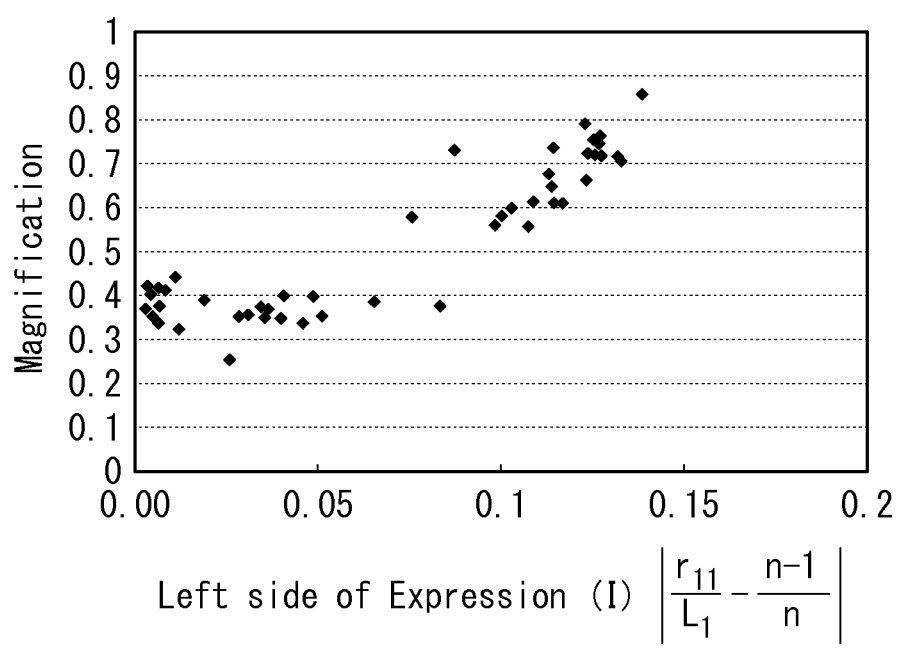
FIG. 20 is a graph illustrating the relationship between the left side of Expression (26) and the magnification of the lens.

A first lens 20 for which the left side of Expression (26) was 0 to 0.15 was also designed, and the magnification of the designed lens was examined. FIG. 20 illustrates the relationship between the left side of Expression (26) and the magnification.

As illustrated in FIG. 20, it is clear that as the left side of Expression (26) increases, the magnification increases. Furthermore, it is clear that if the left side of Expression (26) is less than 0.2, the magnification of the first lens 20 is less than one.

Based on the curvature radius $r_{11}$ of the first surface of the first lens 20, the thickness $L_1$ of the first lens 20, the interval $L_{12}$ between the first lens 20 and the second lens 21, and the refractive index n of the first lens 20 in the unit optical systems 23 of Example 1 through Example 5, the left side of Expression (30) and the left side of Expression (31) were calculated. Table 15 lists the calculation results.

TABLE 15

|  | Example 1 | Example 2 | Example 3 | Example 4 | Example 5 |
|---|---|---|---|---|---|
| $\frac{n \times L_{12}}{L_1}$ | 0.612 | 0.612 | 0.612 | 0.268 | 0.802 |
| $\frac{(n-1) \times L_{12}}{r_{11}}$ | 0.623 | 0.617 | 0.623 | 0.419 | 0.829 |

As shown in Table 15, the left sides of Expressions (30) and (31) calculated for the unit optical systems 23 of Example 1 through Example 5 were less than one in each case, thus demonstrating that a unit optical system 23 satisfying Expressions (30) and (31) can be formed.

Based on the curvature radius $r_{11}$ of the first surface of the first lens 20 and the distance between object images $L_{total}$ in the unit optical systems 23 of Example 1 through Example 5, $(r_{11}/L_{total})$ 1 was calculated. Table 16 lists the calculation results.

TABLE 16

|  | Example 1 | Example 2 | Example 3 | Example 4 | Example 5 |
|---|---|---|---|---|---|
| $\frac{r_{11}}{L_{total}}$ | 0.052 | 0.052 | 0.051 | 0.081 | 0.043 |

As shown in Table 16, $(r_{11}/L_{total})$ calculated for the unit optical systems 23 of Example 1 through Example 5 exceeded 0.03, thus demonstrating that a unit optical system 23 satisfying Expression (32) can be formed.

Figure 21:
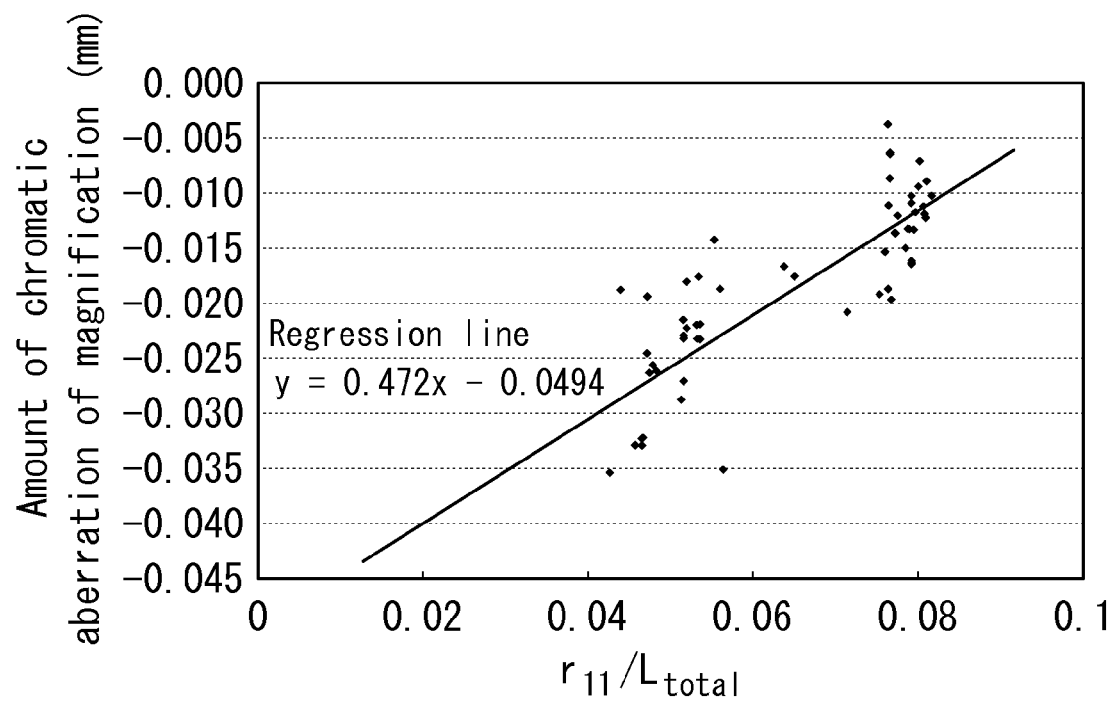
FIG. 21 is a graph illustrating the relationship between $r_{11}/L_{total}$ and the amount of chromatic aberration of magnification.

The chromatic aberration of magnification was calculated for a unit optical system 23 designed so that Expressions (1) to (5), (30), and (31) were satisfied, and so that $r_{11}/L_{total}$ was any value in a range of 0.04 to 0.09. FIG. 21 illustrates the relationship between $r_{11}/L_{total}$ and the chromatic aberration of magnification.

As illustrated in FIG. 21, if $r_{11}/L_{total}$ falls below 0.03, it is thought that the absolute value of the amount of chromatic aberration of magnification could exceed 0.04. Therefore, it is clear that by designing the unit optical system 23 so that $r_{11}/L_{total}$ is greater than 0.03, the chromatic aberration of magnification becomes less than 0.04.

Although the present invention has been described by way of embodiments with reference to the accompanying drawings, it is to be noted that various changes and modifications will be apparent to those skilled in the art based on the present disclosure. Therefore, such changes and modifications are to be understood as included within the scope of the present invention.

For example, in Embodiments 1 through 4, the unit optical system 23 is formed so that Expression (2) (D/8L$_0$<tan θ$_g$) is satisfied, yet the unit optical system 23 may also be designed and formed so that 0<tan θ$_g$ is satisfied.

Even when tan θ$_g$<D/8L$_0$, a unit optical system 23 with a deep depth of field can be formed. When tan θ$_g$=0, however, the width of the light beam also needs to be zero. In this case, the amount of light reaching the image surface ends up being approximately zero. Therefore, tan θ$_g$ needs to be at least a value exceeding zero.

Figure 22:
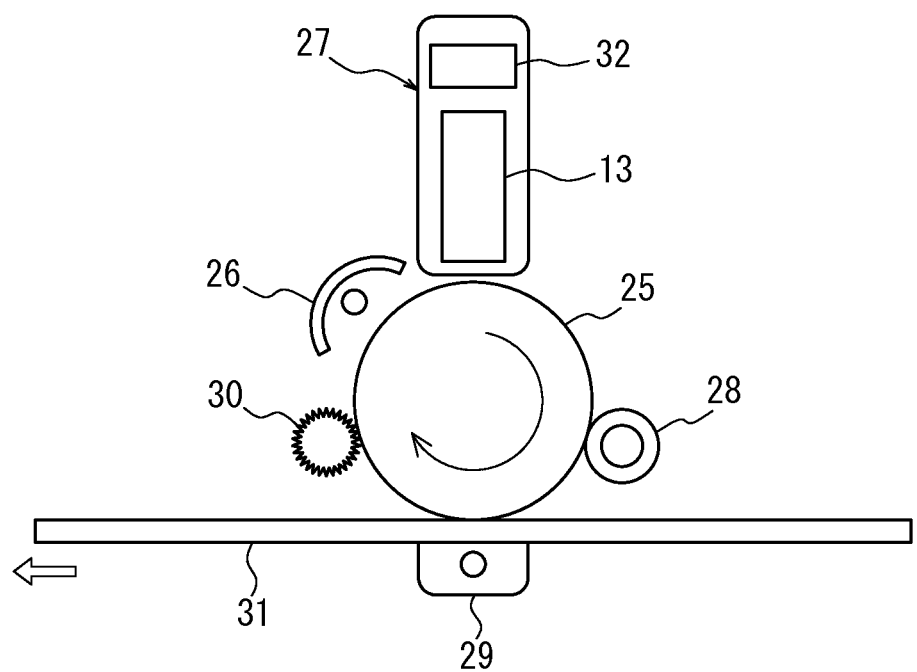
FIG. 22 is a structural diagram schematically illustrating the structure of an image forming device including the erecting equal-magnification lens array unit according to Embodiments 1 to 4.

The erecting equal-magnification lens array unit of the present embodiment is provided in the image reading unit 10 used in an image reading device, yet the erecting equal-magnification lens array unit may be used in an image forming device 27 illustrated in FIG. 22. The image forming device 27 is used in an LED laser printer 24, for example.

The laser printer 24 includes a photoconductive drum 25, a charger 26, the image forming device 27, a developing unit 28, a transfer unit 29, and a charge remover 30. The photoconductive drum 25 is cylindrical and rotates about an axle. The charger 26 charges the surface of the photoconductive drum 25. The image forming device 27 forms an electrostatic latent image on the charged photoconductive drum 25. The developing unit 28 develops the electrostatic latent image with toner. The transfer unit 29 transfers the developed image to paper 31. The charge remover 30 removes the charge from the charged photoconductive drum 25.

The image forming device 27 includes the erecting equal-magnification lens array unit 13 of the present embodiment and an LED substrate 32. LEDs are provided in a straight line on the LED substrate 32. By controlling the light emitted by each LED, the LED substrate 32 forms a 1D image. The erecting equal-magnification lens array unit 13 exposes the image formed by the LED substrate 32 to the above-described photoconductive drum 25.

REFERENCE SIGNS LIST

10: Image reading unit
11: Cover glass
12: Illumination system
13, 13': Erecting equal-magnification lens array unit
14: Image sensor
15: Position regulating member
16: Hole
17: First lens array
18: Second lens array
19: Connecting portion
20: First lens
21: Second lens
22: Light-transmitting hole
23, 23': Unit optical system
24: Laser printer
25: Photoconductive drum
26: Charger
27: Image forming device
28: Developing unit
29: Transfer unit
30: Charge remover
31: Paper
cg: Center of gravity
cl: Center line
c1, c2: First chamber, second chamber
fi: Fine optical image
ics: Image reading surface
is: Image surface
os: Object surface

The invention claimed is:

1. An erecting equal-magnification lens array unit comprising:
a first lens array including a plurality of first lenses, the first lenses being arranged along a first direction perpendicular to optical axes of the first lenses; and
a second lens array including a plurality of second lenses, optical axes of the second lenses overlapping with optical axes of the first lenses, the second lenses being arranged along the first direction, wherein
each optical system formed by each first lens and each second lens with overlapping optical axes is an erecting equal-magnification optical system,
each optical system is substantially telecentric on at least an object side,
the first lens array and the second lens array are connected so that an imaging position, by each first lens, of an object at a predetermined ideal distance from each optical system is positioned between the first lens array and the second lens array, and
the expression $0.1 \times F < g < 2 \times \beta_1 \times F \times \phi$ is satisfied, where g is an interval between the first lens and second lens, F is an F value of the optical system, φ is a diameter of the second lens, and $\beta_1$ is a magnification of the first lens.

2. The erecting equal-magnification lens array unit according to claim 1, further comprising:
a light blocking portion, with an aperture, between each first lens and each second lens with overlapping optical axes, a diameter of the aperture at a side facing the first lens being smaller than a diameter of the aperture at a side facing the second lens, wherein
an inner surface of the aperture is surface treated to prevent reflection of light.

3. An erecting equal-magnification lens array unit comprising:
a first lens array including a plurality of first lenses, the first lenses being arranged along a first direction perpendicular to optical axes of the first lenses;
a second lens array including a plurality of second lenses, optical axes of the second lenses overlapping with optical axes of the first lenses, the second lenses being arranged along the first direction; and
a light blocking portion, with an aperture, between each first lens and each second lens with overlapping optical axes, wherein
each optical system formed by each first lens and each second lens with overlapping optical axes is an erecting equal-magnification optical system, and
the following expression is satisfied:

$$r_o + (s-1)p < \left(\frac{L_1}{L_0}\frac{1}{n} + 1\right)p < sp - r_o$$

where $r_o$ is a radius of the aperture at a side of the first lens, p is a pitch between adjacent first lenses, $L_o$ is a predetermined object distance from the first lens to an object surface, $L_1$ is a thickness of the first lens, n is a refractive index of the first lens, and s is any integer.

4. The erecting equal-magnification lens array unit according to claim 3, wherein a diameter of the aperture at a side facing the first lens is smaller than a diameter of the aperture at a side facing the second lens.

5. The erecting equal-magnification lens array unit according to claim 3, wherein an inner surface of the aperture is surface treated to prevent reflection of light.

6. An erecting equal-magnification lens array unit comprising:
a first lens array including a plurality of first lenses, the first lenses being arranged along a first direction perpendicular to optical axes of the first lenses;
a second lens array including a plurality of second lenses, optical axes of the second lenses overlapping with optical axes of the first lenses, the second lenses being arranged along the first direction; and
a light blocking portion, with an aperture, between each first lens and each second lens with overlapping optical axes, the light blocking portion being near a second surface of the first lens, wherein
each optical system formed by each first lens, the aperture, and each second lens with overlapping optical axes is an erecting equal-magnification optical system, and
the following expression is satisfied:

$$\left| \frac{r_{11}}{L_1} - \frac{n-1}{n} \right| \leq 0.2$$

where $r_{11}$ is a curvature radius of a first surface of the first lens, $L_1$ is a thickness of the first lens, and n is a refractive index of the first lens.

7. An erecting equal-magnification lens array unit comprising:
a first lens array including a plurality of first lenses, the first lenses being arranged along a first direction perpendicular to optical axes of the first lenses;
a second lens array including a plurality of second lenses, optical axes of the second lenses overlapping with optical axes of the first lenses, the second lenses being arranged along the first direction; and
a light blocking portion, with an aperture, between each first lens and each second lens with overlapping optical axes, wherein
each optical system formed by each first lens and each second lens with overlapping optical axes is an erecting equal-magnification optical system,
each optical system is substantially telecentric on at least an object side, and the following expressions are satisfied:

$$\frac{n \times L_{12}}{L_1} < 1$$

$$(n-1)\frac{L_{12}}{r_{11}} < 1$$

where $r_{11}$ is a curvature radius of a first surface of the first lens, $L_1$ is a thickness of the first lens, $L_{12}$ is an interval between the first lens and second lens, and n is a refractive index of the first lens.

8. The erecting equal-magnification lens array unit according to claim 7, wherein the following expression is satisfied:

$$0.03 < \frac{r_{11}}{L_{total}}$$

where $L_{total}$ is a distance between object images.

9. The erecting equal-magnification lens array unit according to claim 7, wherein the first lens is an optical reduction system, and the second lens is an optical expansion system.

10. An image reading device comprising the erecting equal-magnification lens array unit according to claim 1.

11. An image forming device comprising the erecting equal-magnification lens array unit according to claim 1.

12. An image reading device comprising the erecting equal-magnification lens array unit according to claim 3.

13. An image reading device comprising the erecting equal-magnification lens array unit according to claim 6.

14. An image reading device comprising the erecting equal-magnification lens array unit according to claim 7.

15. An image forming device comprising the erecting equal-magnification lens array unit according to claim 3.

16. An image forming device comprising the erecting equal-magnification lens array unit according to claim 6.

17. An image forming device comprising the erecting equal-magnification lens array unit according to claim 7.

* * * * *